(12) United States Patent
Cattaneo

(10) Patent No.: US 11,560,915 B2
(45) Date of Patent: Jan. 24, 2023

(54) COMPACT JOINING AND LEVELING SYSTEM FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 1171 days.

(21) Appl. No.: 16/065,773

(22) PCT Filed: Feb. 23, 2017

(86) PCT No.: PCT/EP2017/054138
§ 371 (c)(1),
(2) Date: Jun. 22, 2018

(87) PCT Pub. No.: WO2017/153175
PCT Pub. Date: Sep. 14, 2017

(65) Prior Publication Data
US 2019/0003505 A1    Jan. 3, 2019

(30) Foreign Application Priority Data

Mar. 11, 2016 (IT) .......... 102016000025845
Feb. 14, 2017 (IT) .......... 102017000016178

(51) Int. Cl.
*F16B 12/10* (2006.01)
*A47B 91/02* (2006.01)
*A47B 96/07* (2006.01)
*F16B 12/20* (2006.01)

(52) U.S. Cl.
CPC ........... *F16B 12/10* (2013.01); *A47B 91/026* (2013.01); *A47B 91/028* (2013.01); *A47B 96/07* (2013.01); *F16B 12/2063* (2013.01); *F16B 2012/106* (2013.01)

(58) Field of Classification Search
None
See application file for complete search history.

(56) References Cited

U.S. PATENT DOCUMENTS 11,333,184 B2 * 5/2022 Cattaneo ............. F16B 12/2063
2018/0238366 A1 * 8/2018 Cattaneo ............. F16B 12/2036
2019/0345965 A1 * 11/2019 Cattaneo ............. F16B 12/46
(Continued)

FOREIGN PATENT DOCUMENTS

AU    2009227484    5/2010
EP    2653068       10/2013
(Continued)

*Primary Examiner* — Steven M Marsh
(74) *Attorney, Agent, or Firm* — Themis Law

(57) ABSTRACT

A compact joining and leveling system for parts of furniture and furnishing items with a bottom and a shoulder includes, in combination, a front-foot unit and a rear-foot unit, wherein each front- and rear-foot unit includes a leveling group with a regulation mechanism in height that can be maneuvered with tools, wherein the leveling group of the front-and rear-foot units can be actuated from the front with respect to the piece of furniture through the space between the base and the floor, wherein the system also includes a connection group for stably interconnecting the bottom and the shoulder through a blocking element, and wherein the connection group can be actuated from the front with respect to the piece of furniture through the space between the bottom and the floor.

19 Claims, 23 Drawing Sheets

(56) References Cited

U.S. PATENT DOCUMENTS

2019/0387882 A1* 12/2019 Cattaneo ................ A47B 91/02
2021/0270303 A1*  9/2021 Cattaneo ............. F16B 12/2063
2021/0315381 A1* 10/2021 Cattaneo .............. A47B 91/028
2022/0047078 A1*  2/2022 Cattaneo .............. A47B 91/005

FOREIGN PATENT DOCUMENTS

WO    2005115199    12/2005
WO    2015053637     4/2015

* cited by examiner

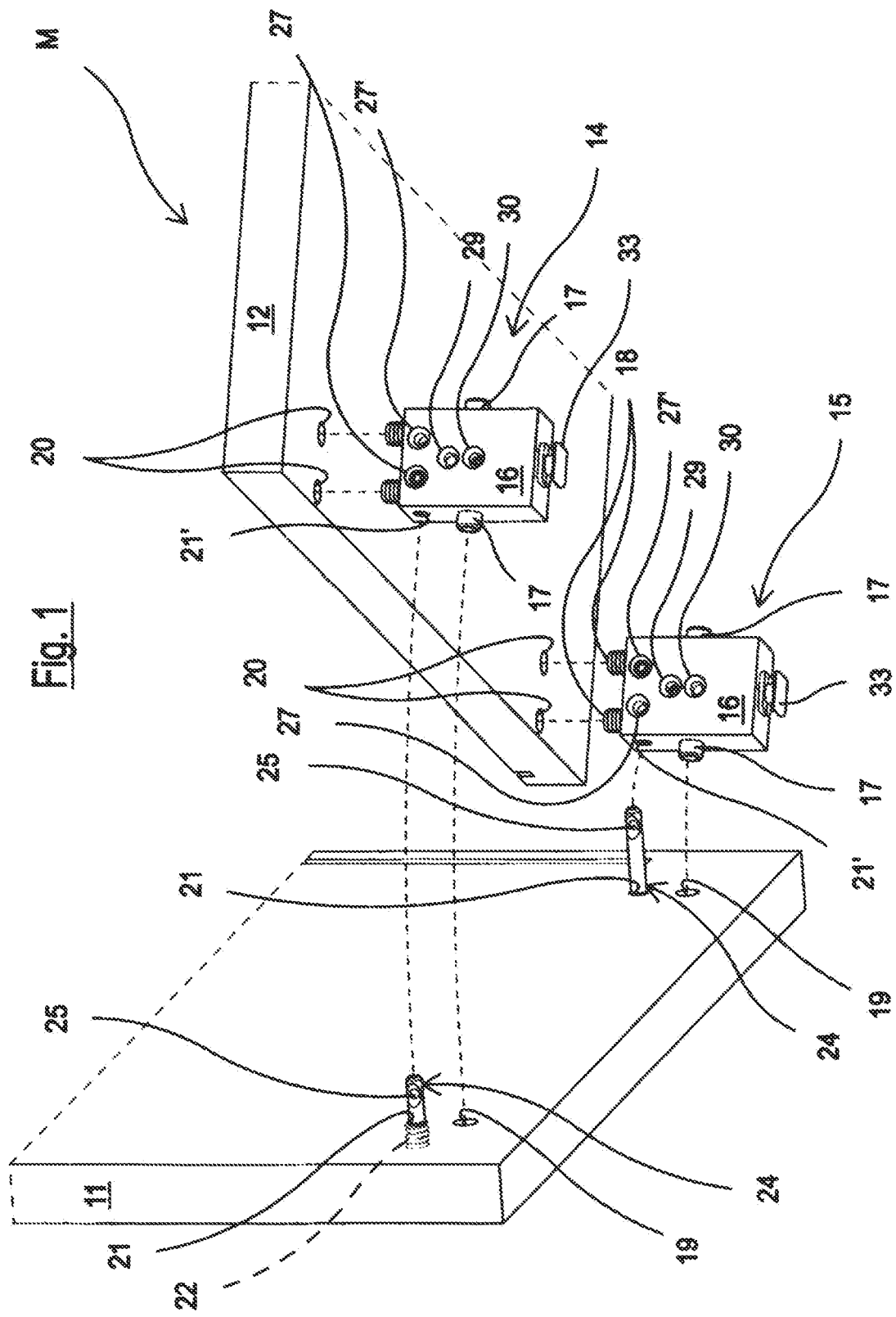

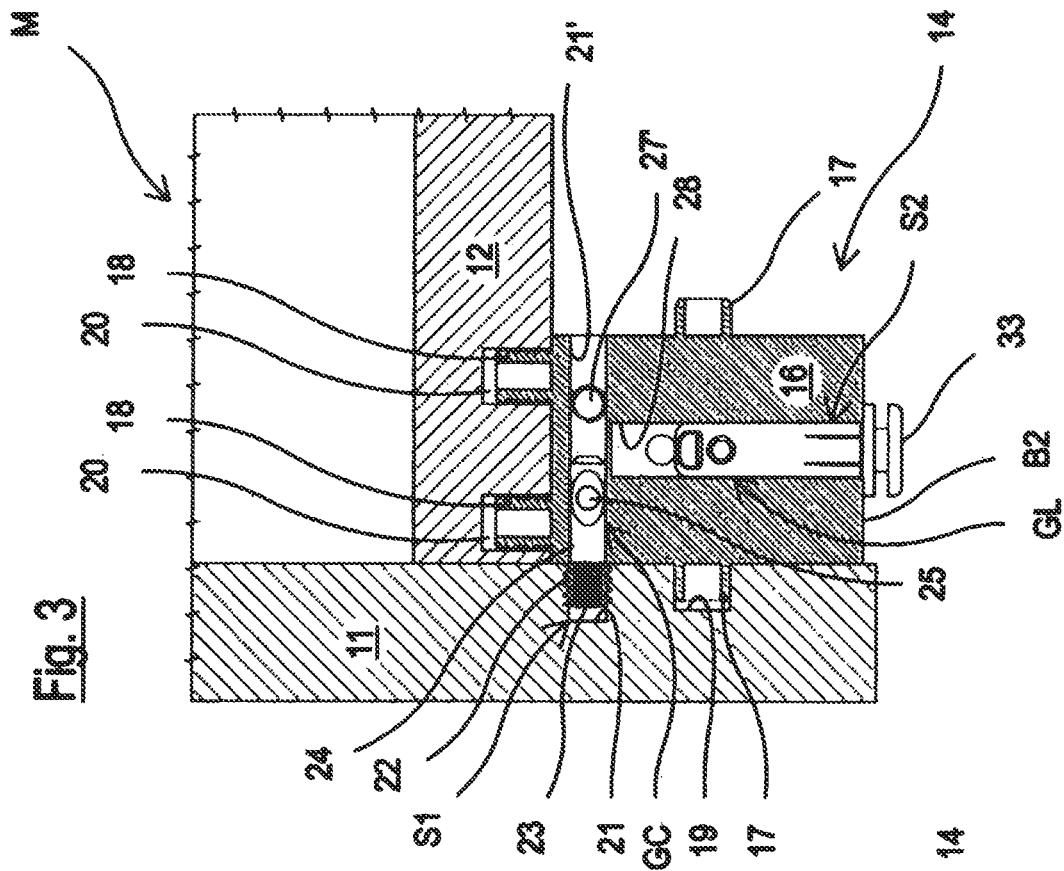
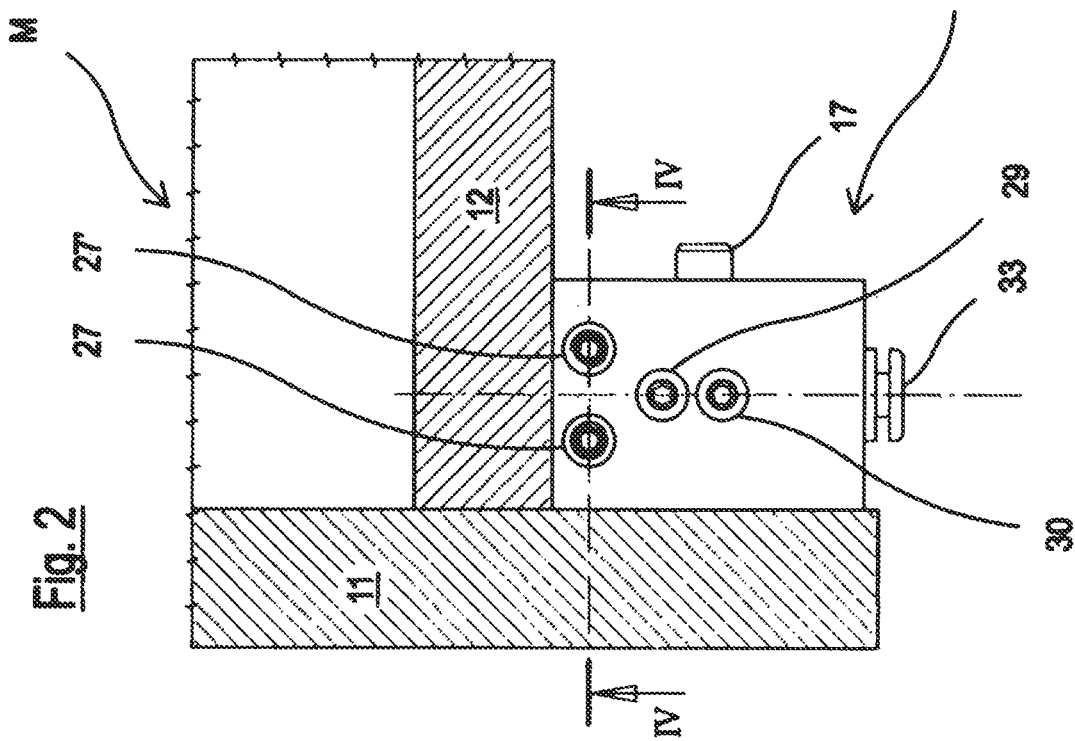

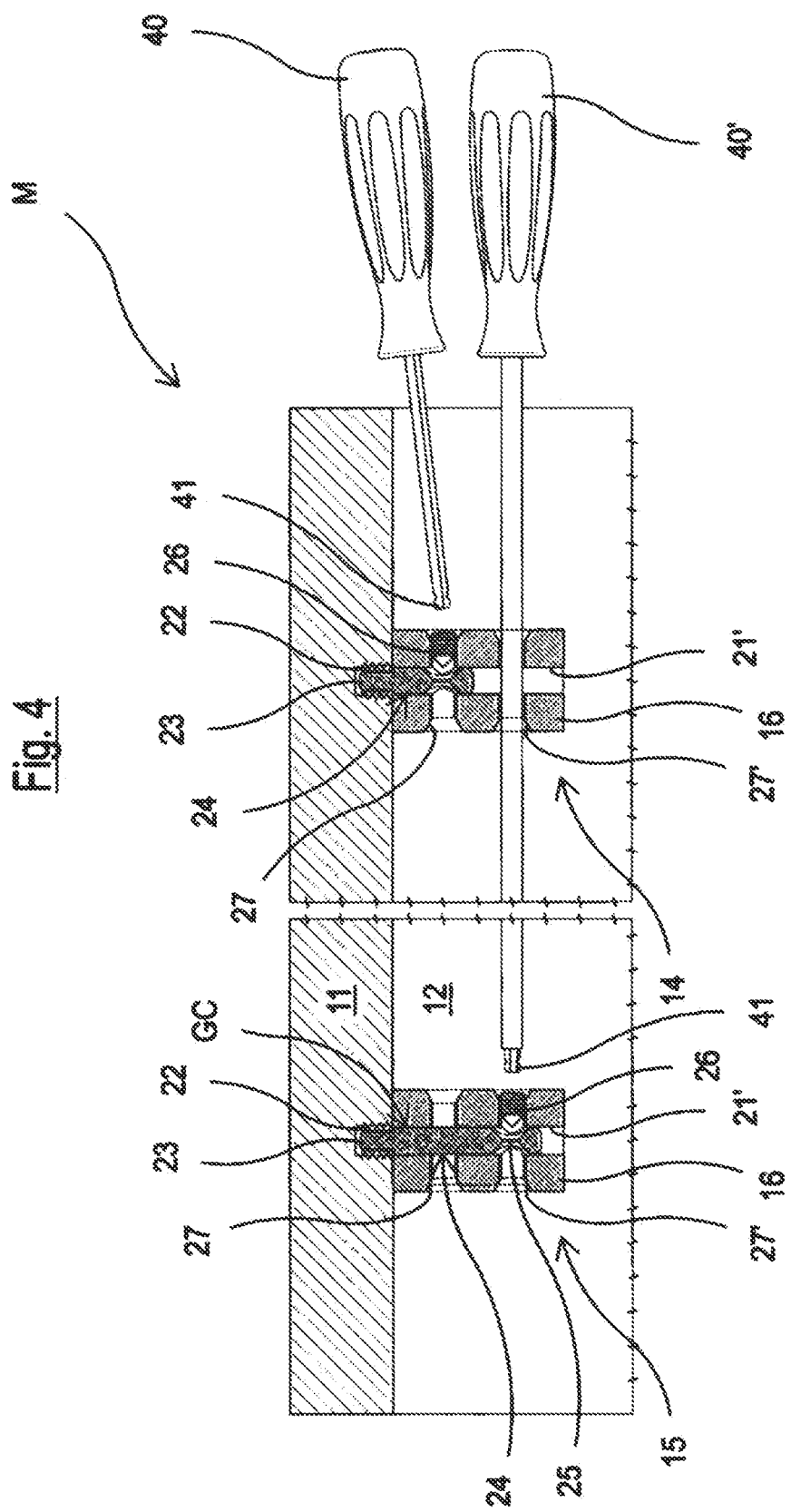

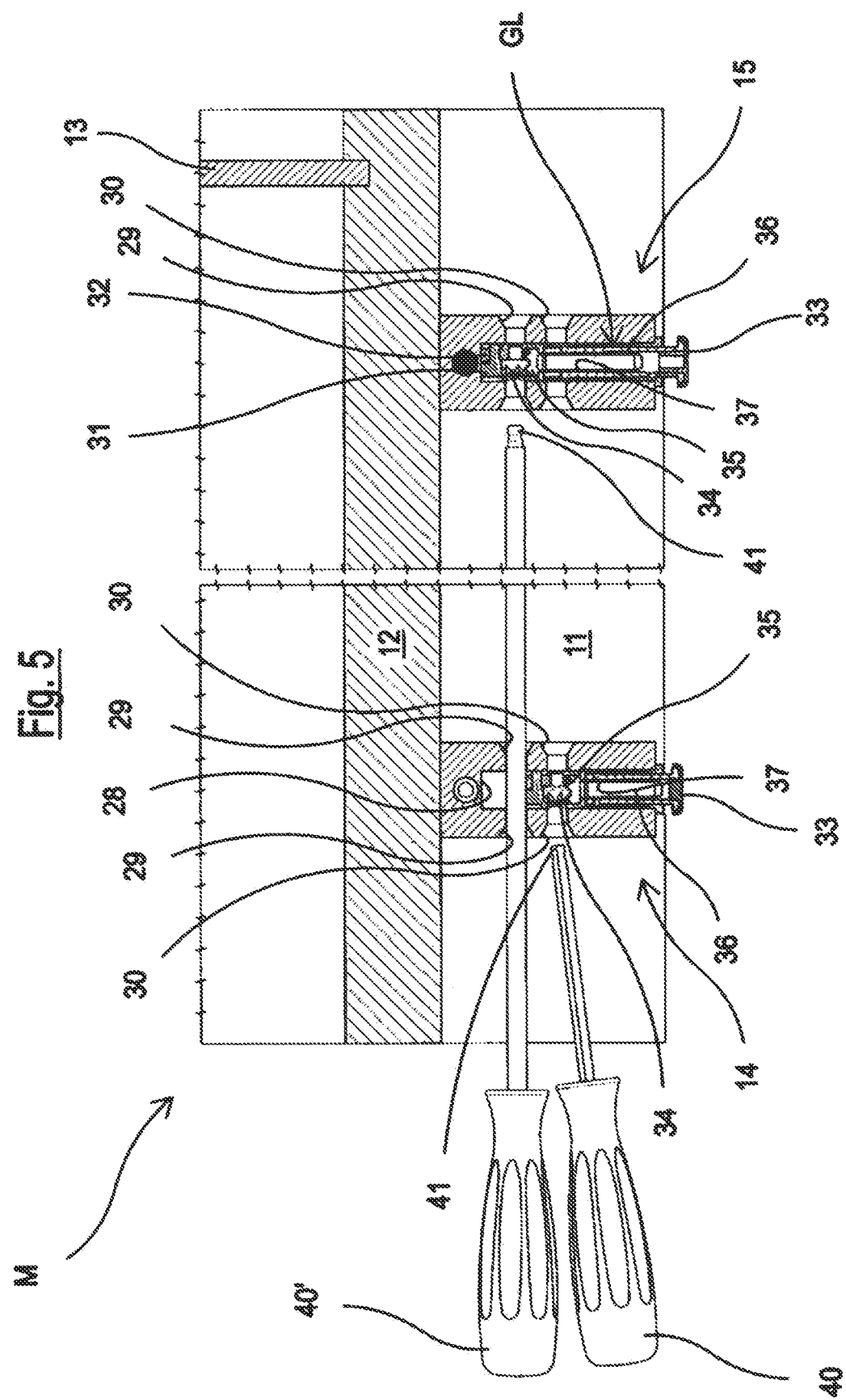

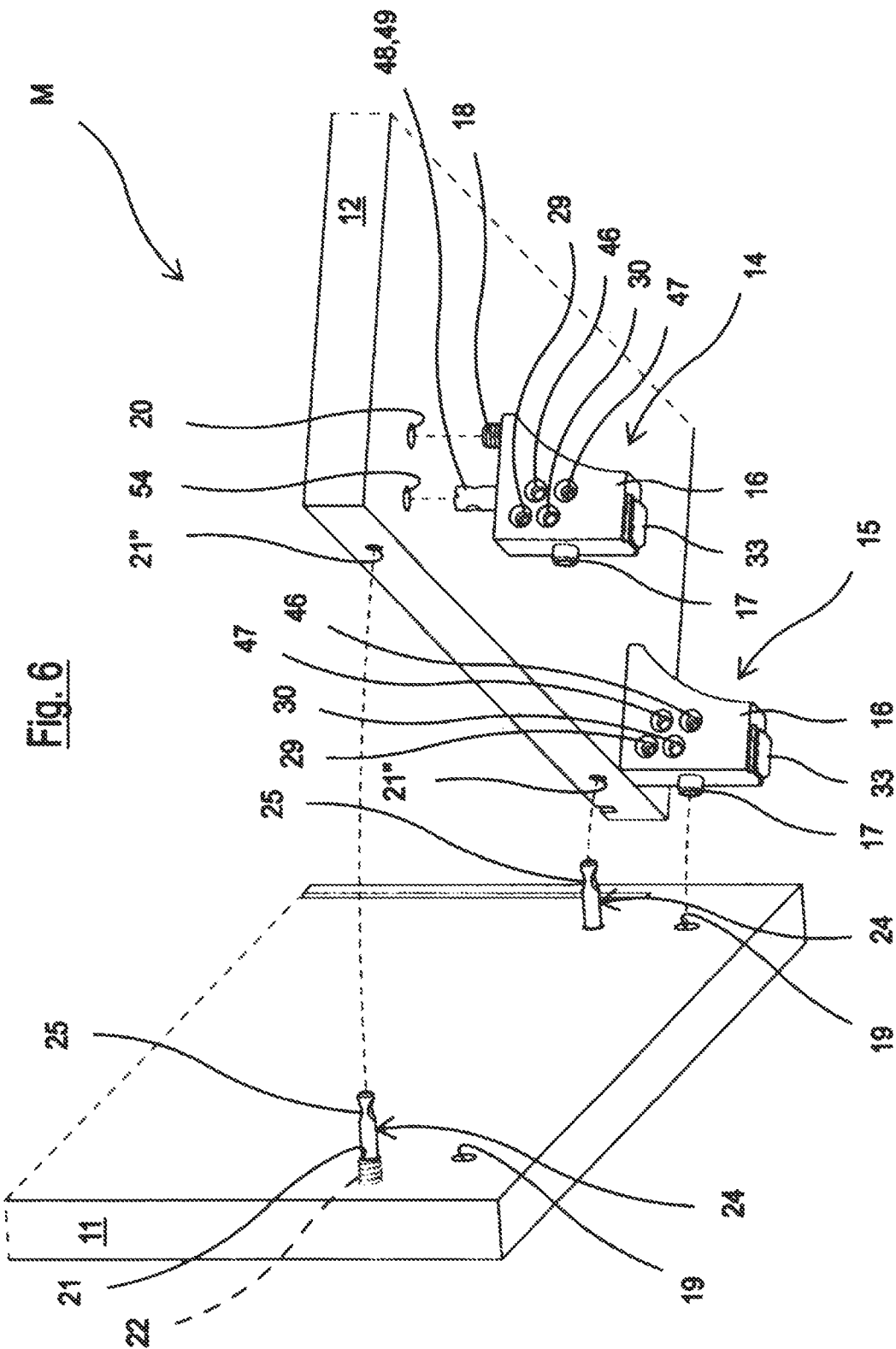

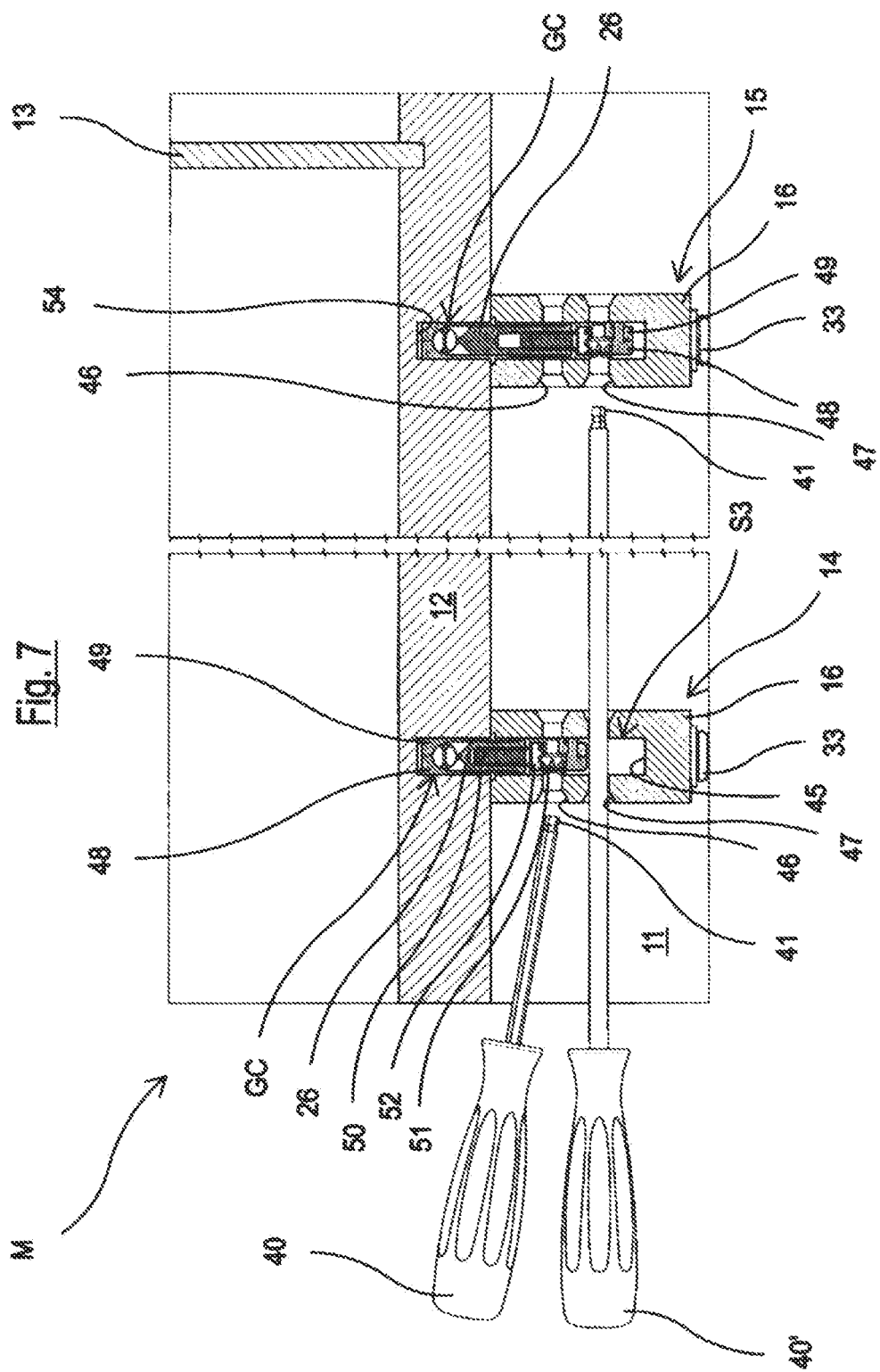

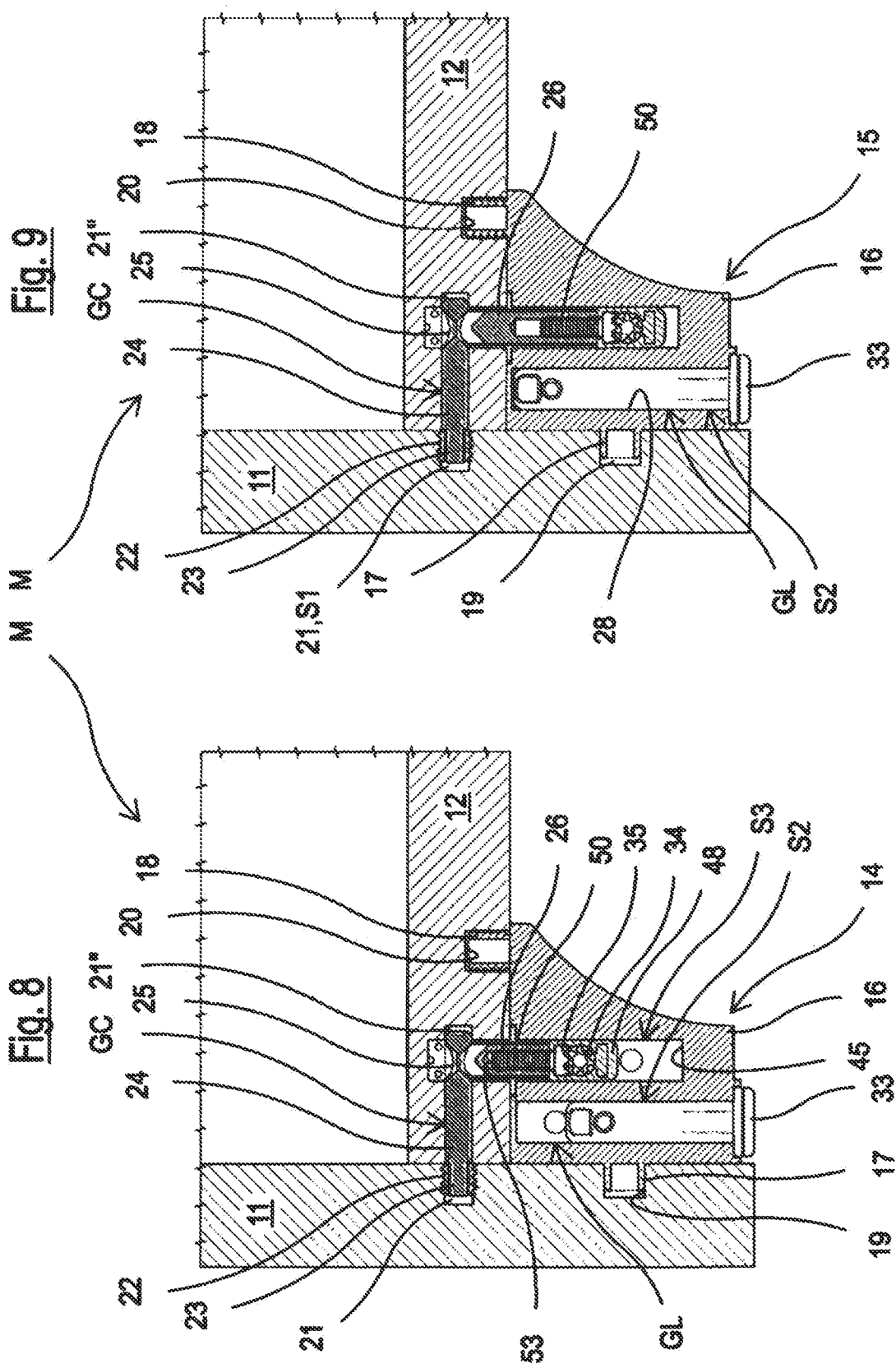

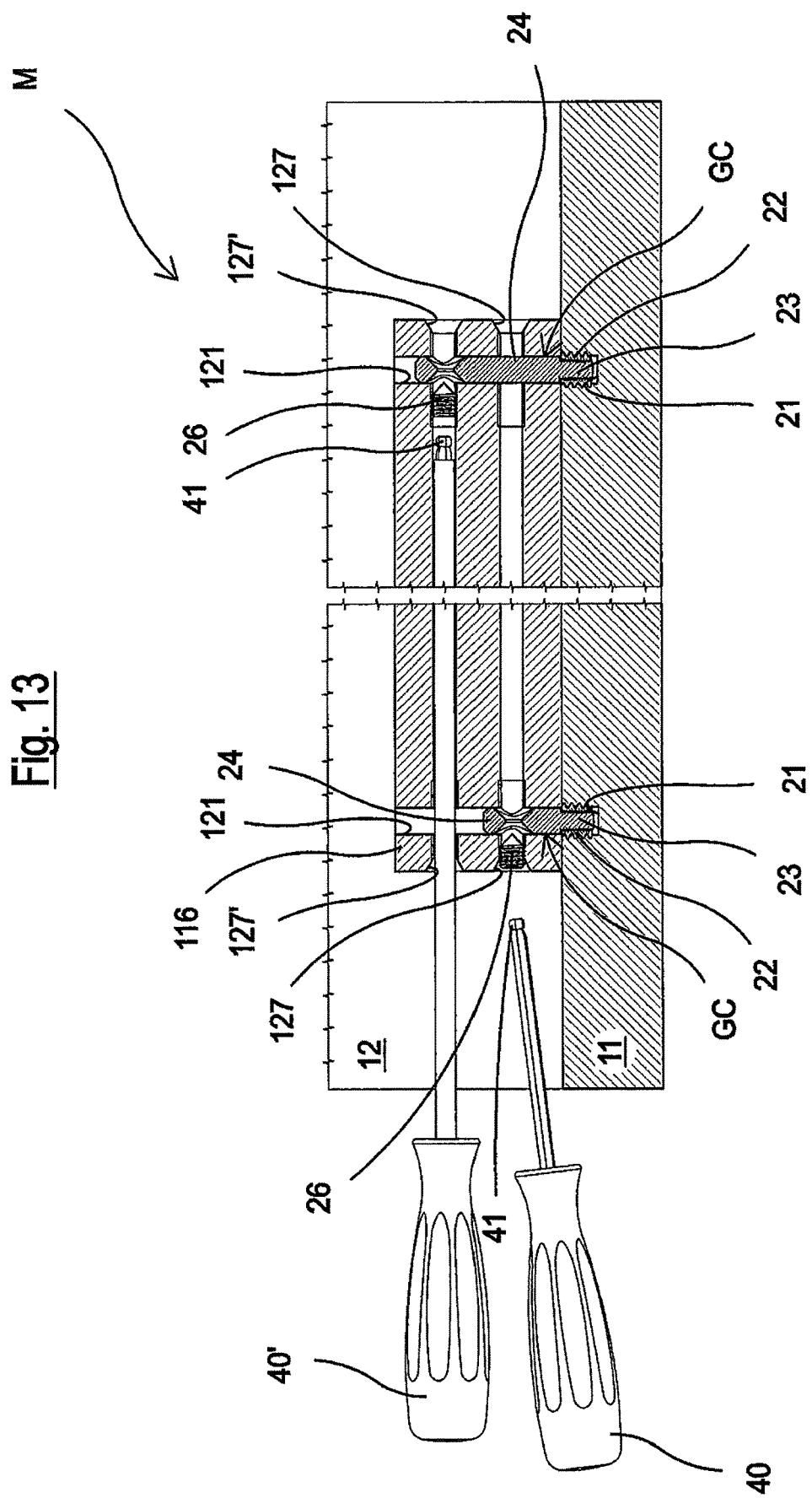

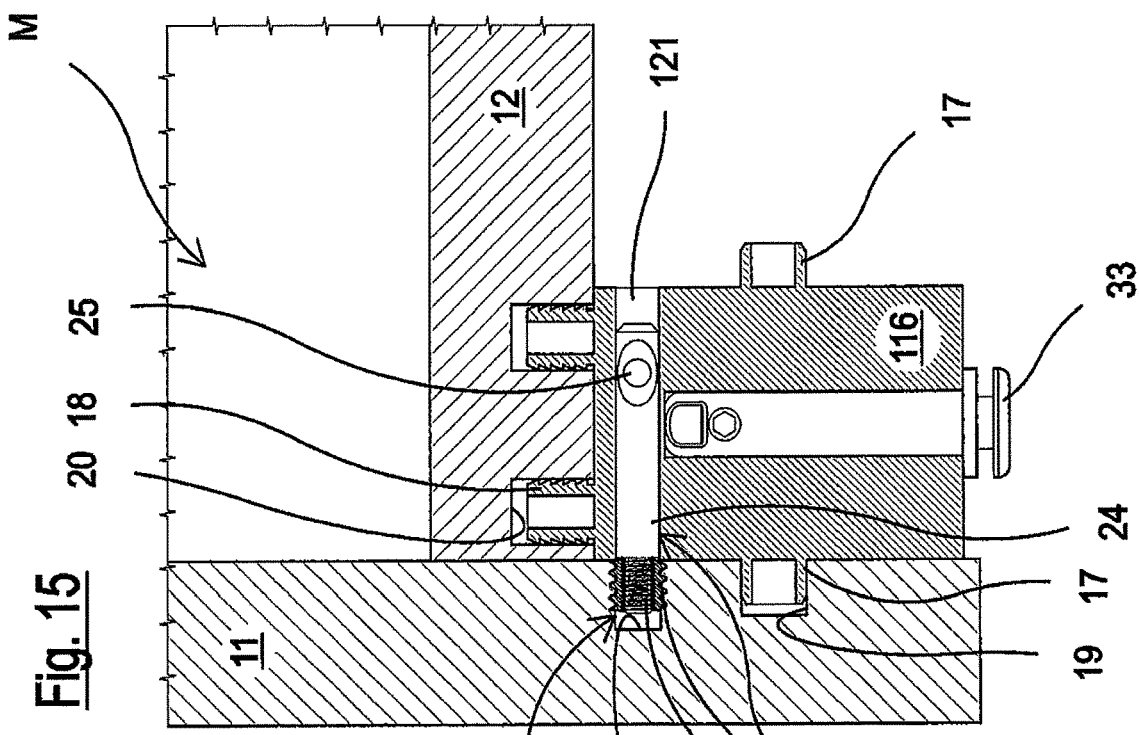
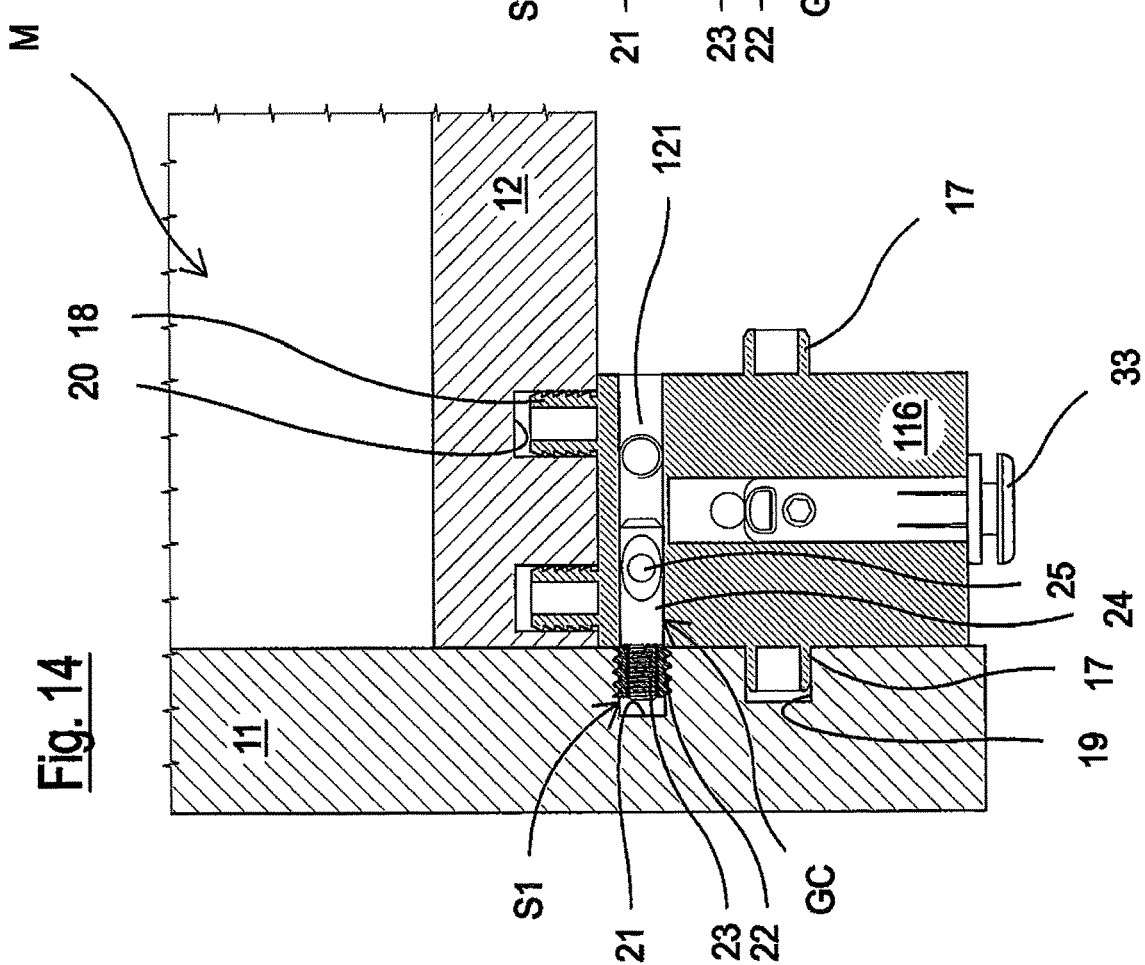

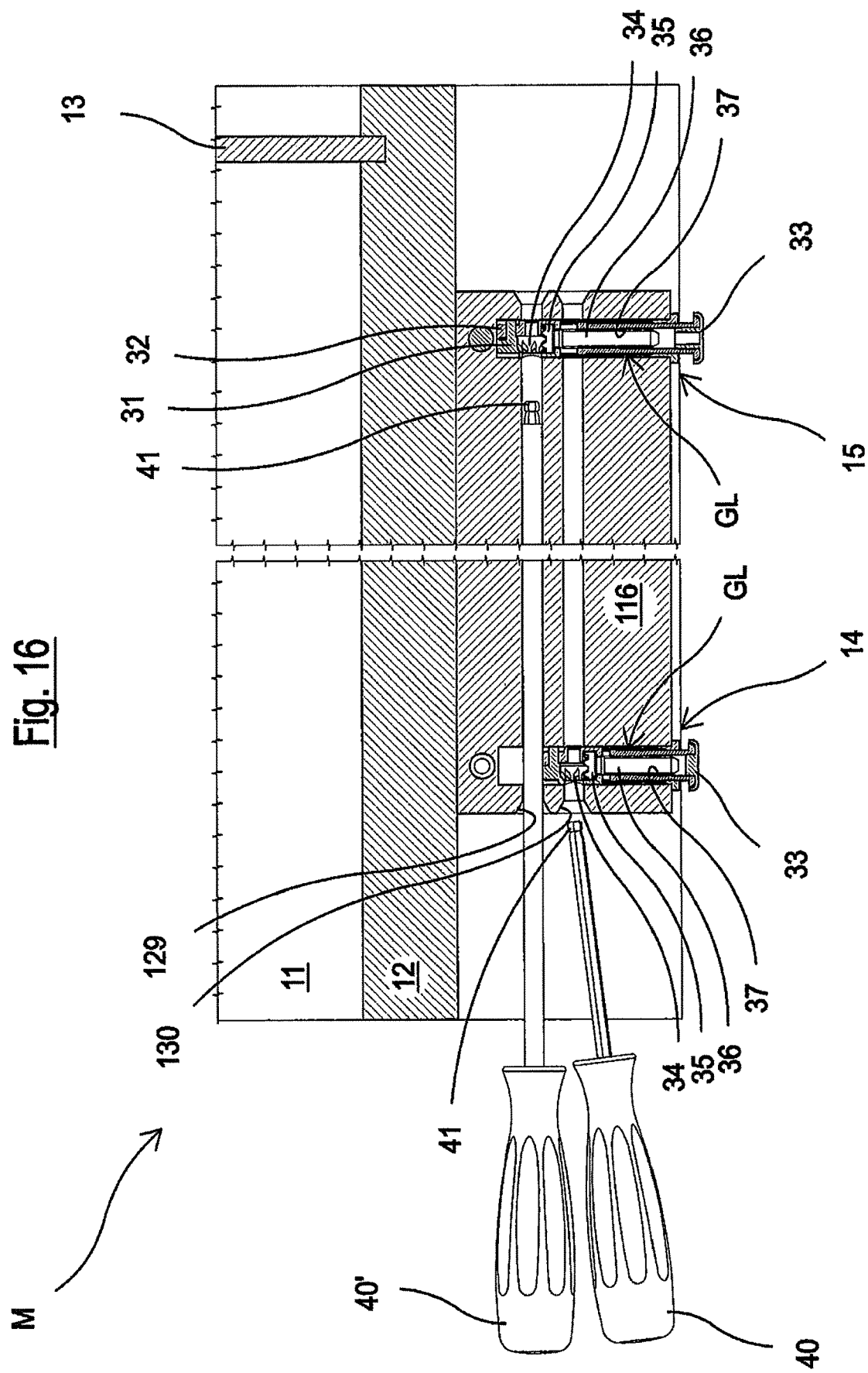

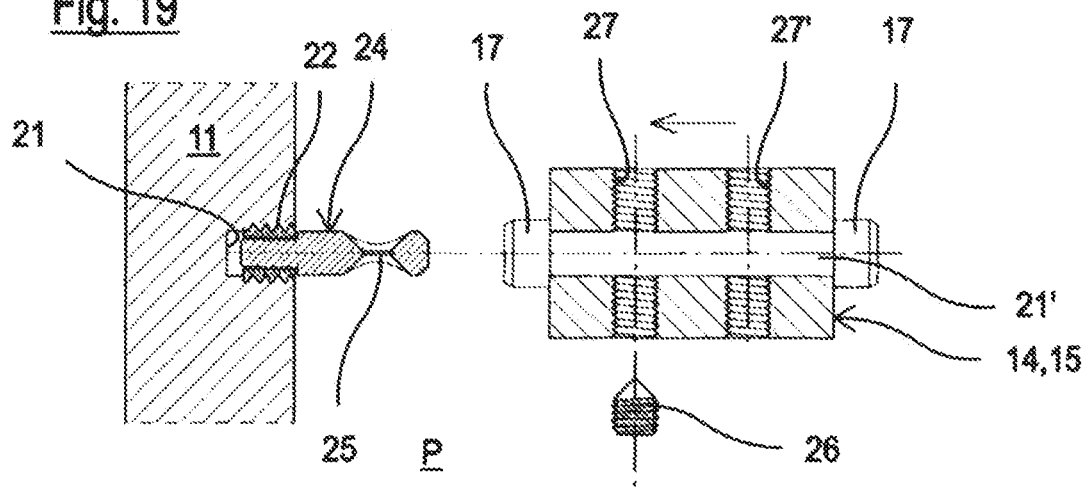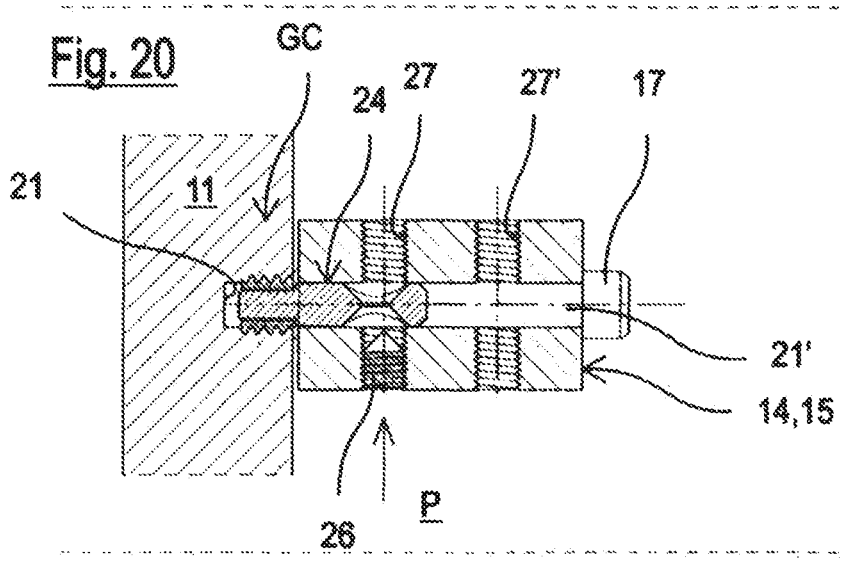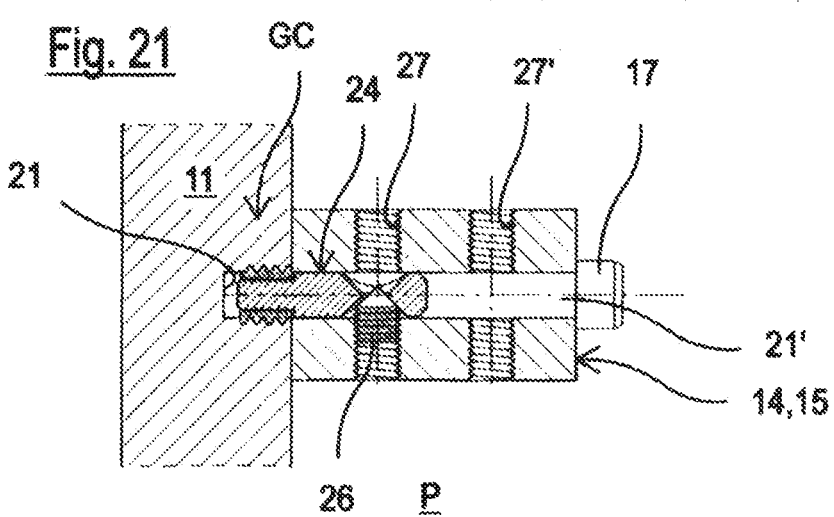

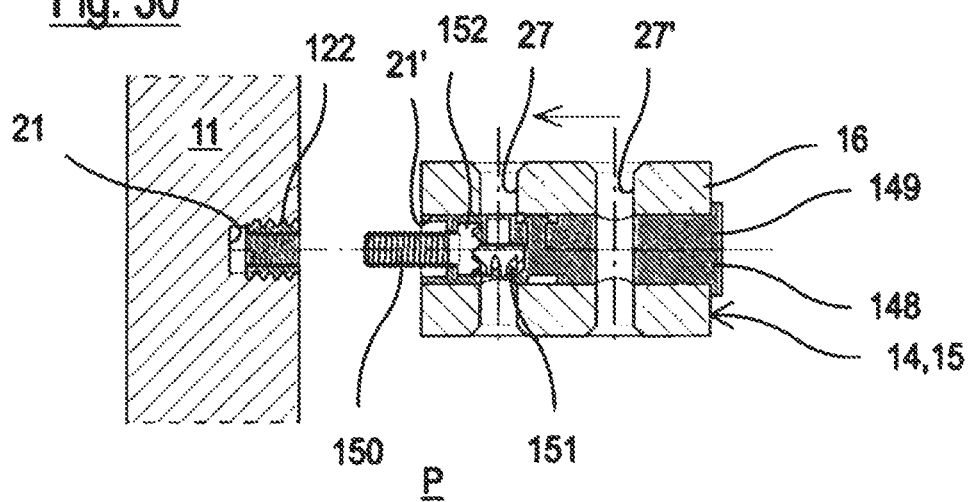
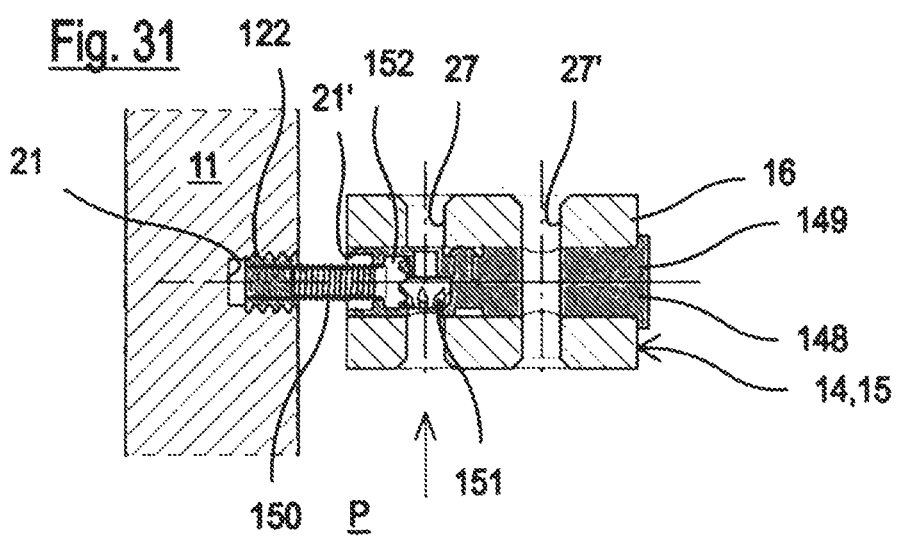
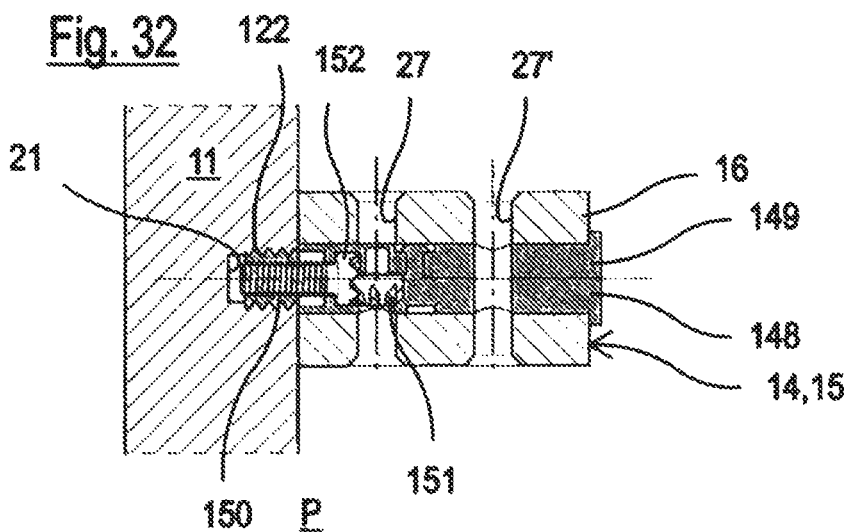

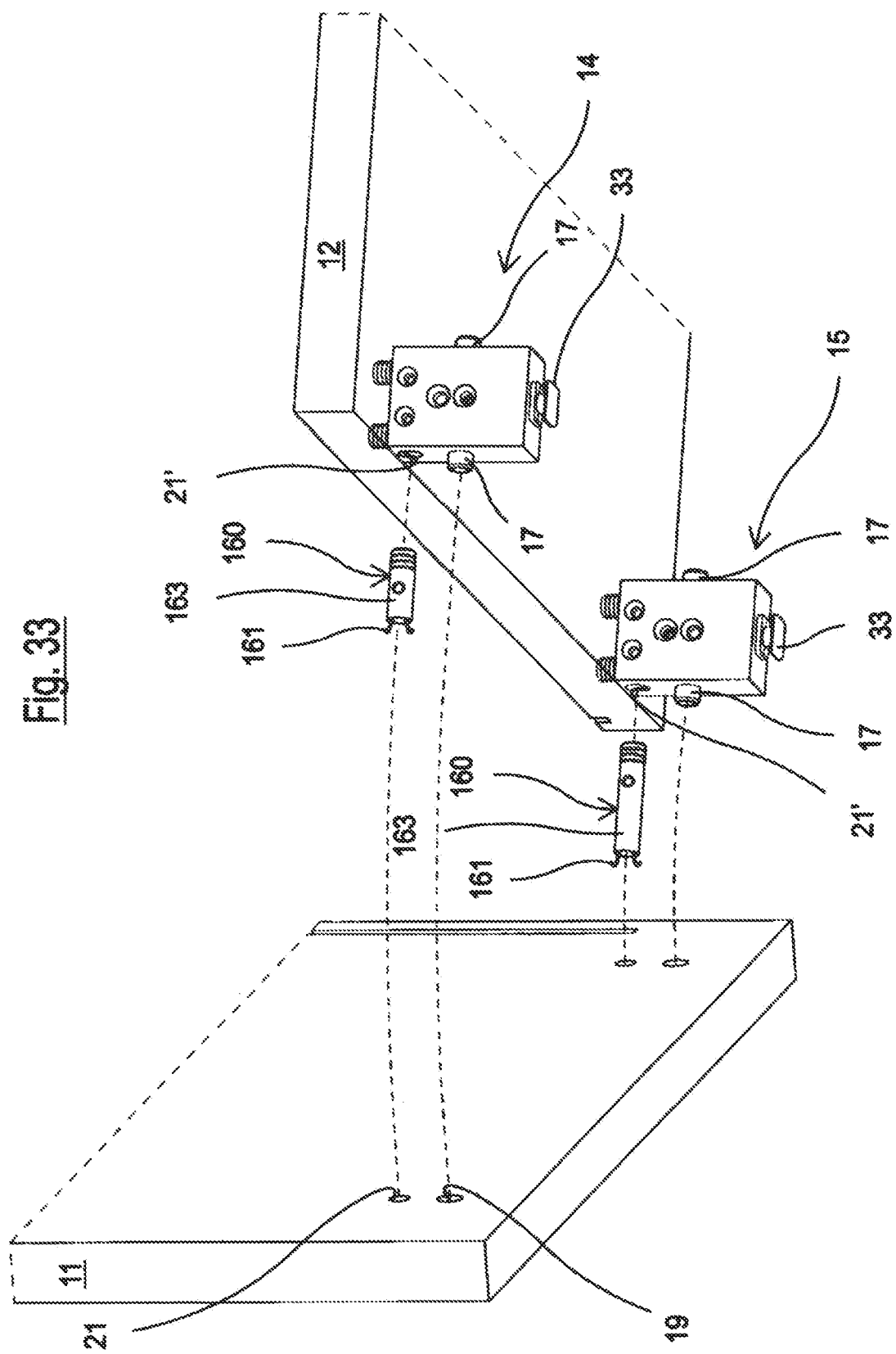

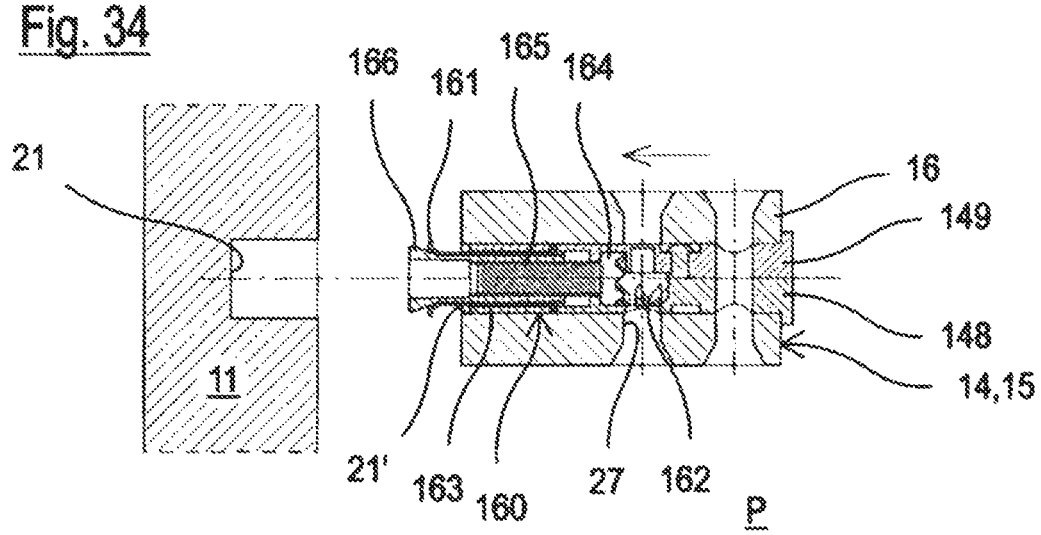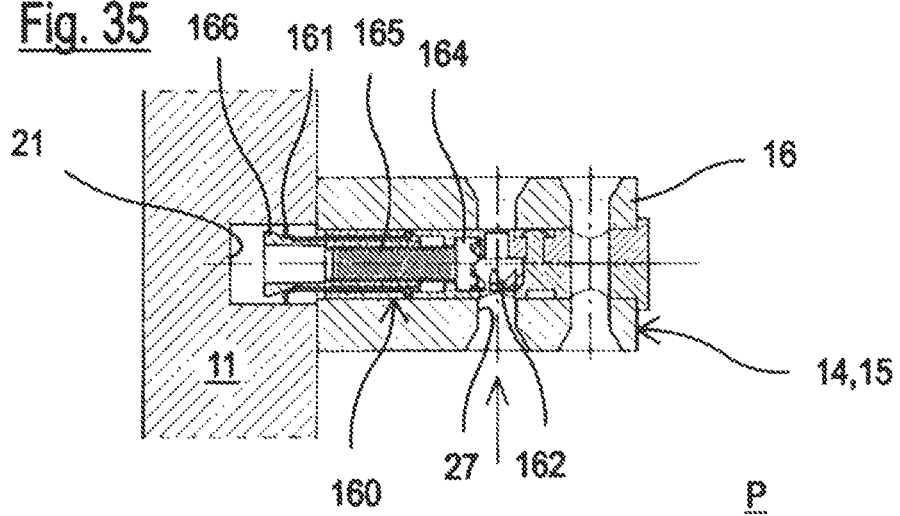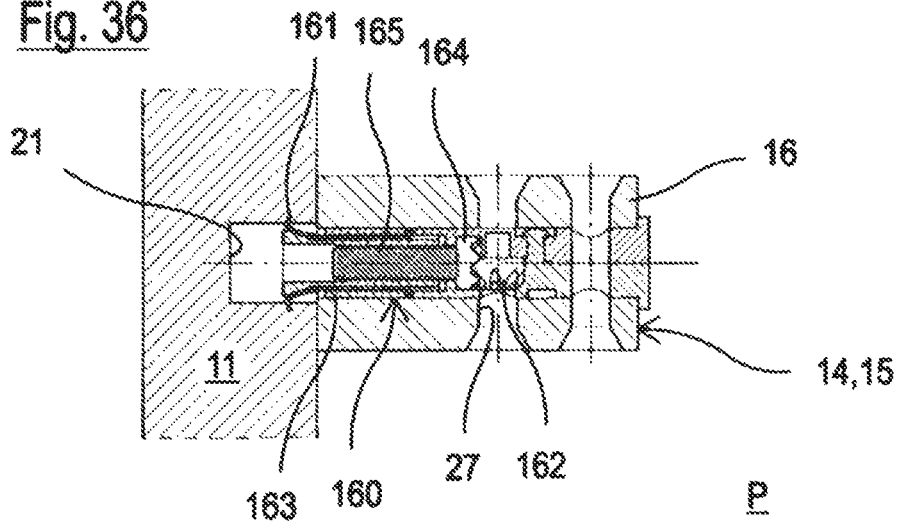

COMPACT JOINING AND LEVELING SYSTEM FOR PARTS OF FURNITURE AND FURNISHING ITEMS

The present invention relates to a compact joining and leveling system for parts of furniture and furnishing items.

Various joining and leveling systems for parts of furniture and furnishing items are known, that involve the formation of a series of visible holes and spaces destined for the actuation of the joints and in particular for having a certain free dimension beneath the furniture for regulating the rear feet of the furniture and rear joints.

A solution described and illustrated in Italian patent 1326283 has been proposed, for example, which relates to a device for joining panels of a piece of furniture. The device, moreover, also proposes the possibility of establishing a connection with an extendable leveling foot which is thus associated with the joining device. This therefore allows not only the joining of the parts of furniture, but also an adjustment of the furniture in height by intervening on its supporting feet.

This type of device requires a free space above a base panel of the furniture, i.e. above the device to also be able to act on the adjustment of the supporting foot. All of this is naturally possible after the joint between the shoulder and base and/or shelf of the furniture has been assembled and blocked.

As the device of Italian patent 1326283 requires an actuation of the supporting foot with a tool passing through its interior, a holing passing through the base or bottom, or shelf of the furniture, must be provided in order to give access from above. Once this holing has been used for effecting the assembly and regulation, it must be covered by a suitable cap that is visible to an observer and lowers the aesthetic value of the furniture. Furthermore, the presence of caps on the base or shelf can be a disturbing element for the positioning of objects that can knock against said cap or caps.

Consequently, in the present art, either separate devices must be used for effecting the joining and leveling, or, if a device such as that indicated in the above-mentioned Italian patent is adopted, visible holings must be provided, or in any case that can only be covered with caps that do not allow smooth surfaces free of obstacles or holings.

Finally, an actuation from above, in particular for the rear joints and leveling, is not always easy, in the presence of limited spaces between shelves or minimum distances from the bottom of the furniture or rear wall of the furniture.

Finally, furniture such as modular kitchen bases incorporating built-in dishwashers, refrigerators, ovens and other household appliances, cannot provide adjustable feet from inside the furniture which is occupied by the household appliance.

The general objective of the present invention is to provide a joining and leveling system for parts of furniture and furnishing items which solves the problems and drawbacks indicated above.

A further objective of the present invention is to provide a joining and leveling system for parts of furniture and furnishing items that is particularly simplified and compact with respect to the currently known systems.

Another objective of the present invention is to provide a joining and leveling system for parts of furniture and furnishing items that allows a front connection and adjustment, also for rear joints and leveling feet.

Yet another objective of the present invention is to provide a joining and leveling system for parts of furniture and furnishing items that is also accessible when said furniture has an extremely limited space beneath the bottom and with serious access difficulties.

A further objective of the invention is to provide a system which is such as to be compact and minimize the elements forming it.

The above objectives are achieved by a system having the characteristics indicated in the enclosed claim 1 and subclaims.

The structural and functional characteristics of the invention and its advantages with respect to the known art can be clearly understood from the following description, referring to the enclosed drawings, that illustrate various embodiment examples of the invention itself.

In the drawings:

FIG. 1 is a perspective view with exploded parts that illustrate a first example of a joining and leveling system for parts of furniture and furnishing items produced according to the present invention designed for joining a shoulder and a base or bottom of a piece of furniture;

FIGS. 2 and 3 are an enlarged raised view and a section produced in correspondence with a front supporting foot of FIG. 1 when assembled with respect to the above-mentioned shoulder and base;

FIG. 4 is a longitudinal sectional view obtained according to the line IV-IV of FIG. 2;

FIG. 5 is a sectional view rotated by 90° with respect to that shown in FIG. 4 in an intermediate part of the front and rear supporting feet;

FIG. 6 is a perspective view with exploded parts illustrating a second example of a joining and leveling system for parts of furniture and furnishing items produced according to the present invention designed for joining a shoulder and a base or bottom of a piece of furniture;

FIG. 7 is a longitudinal sectional view obtained in correspondence with front and rear joints of the system between shoulder and base in the case of the example of FIG. 6;

FIGS. 8 and 9 are enlarged transversal sectional views of the joint of the front foot and the joint of the rear foot rotated by 90° with respect to that shown in FIG. 7;

FIG. 13 is a longitudinal sectional view obtained in correspondence with front and rear joints of the system between shoulder and base in the case of the example of FIG. 12;

FIGS. 14 and 15 are enlarged transversal sectional views of the system in correspondence with the joint of the front foot and the joint of the rear foot rotated by 90° with respect to the section shown in FIG. 13;

FIG. 16 is an enlarged longitudinal sectional view of the system with leveling of the front foot and leveling of the rear foot previously shown in FIGS. 14 and 15;

FIGS. 19 to 21 show, in a sectional detail parallel to the floor, an exploded view in position, a close-range view and a view in a blocked position respectively of what is described in FIGS. 1 to 5 in a first embodiment of blocking means between the shoulder and bottom of the furniture forming part of a connection group;

Figure 10:
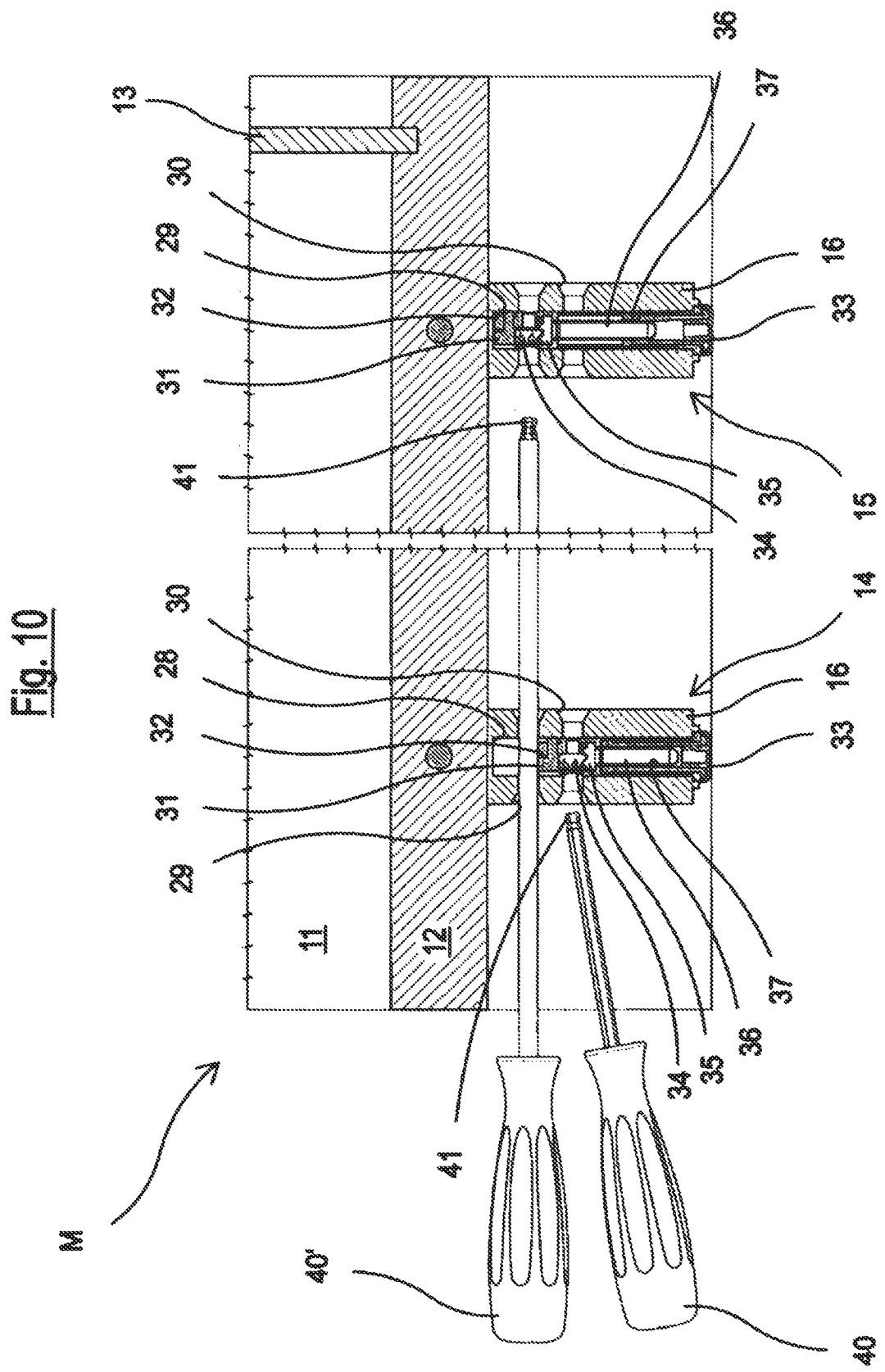
FIG. 10 is an enlarged longitudinal sectional view of the leveling device of the front foot and leveling device of the rear foot previously shown in FIGS. 6 and 7.

FIGS. 30 to 32 respectively show, in a sectional detail parallel to the floor P, an exploded view in position, a close-range view in position and a view in a blocked position of a fourth example of blocking means forming part of a connection group;

FIG. 33 shows, in an exploded perspective view, a fifth example of blocking means forming part of a connection group;

FIGS. 34 to 36 show, in a sectional detail parallel to the floor P, an exploded view in position, a close-range view in position and a view in a blocked position of a fifth example of blocking means forming part of a connection group of FIG. 33.

With reference in general to the drawings, it can be seen that the figures partially illustrate a piece of furniture M, in which shoulders 11 are provided (in the examples side walls)(of which only one is shown) that may or may not terminate in correspondence with a bottom or base 12, i.e. that may or may not reach the floor (not shown), closed at the rear by a lining 13.

As can be observed, in this type of furniture, the space beneath the bottom or base 12 must be completely free and the front access to the adjustable rear feet can be extremely difficult due to the narrow distance between the floor and bottom or base 12 of the furniture M.

The bottom or base 12, close to the corners, provides front and rear feet.

More specifically, FIG. 1 shows how, in a first example, a joining and leveling system for parts of furniture and furnishing items is fixed to the bottom or base 12, comprising at least one front-foot unit 14 and a rear-foot unit 15.

Both units 14 and 15 incorporate joining and leveling devices for parts of furniture and furnishing items.

FIGS. 1 to 5 show how a generic foot unit 14, 15 of the joining and leveling system for parts of furniture and furnishing items according to the invention comprises a body 16, for example prismatic, that can be associated by means of at least one interlocking pin 17 and at least one snap or pressure pin 18 (so-called "double") (two in the example), with a hole 19 of a shoulder 11 and a pair of holes 20 of a base or bottom 12, respectively.

In the example of these figures, it can be seen how the shoulder 11 also provides a seat S1 in the form of a horizontal blind holing 21 in which an internally threaded sleeve 22 is positioned and blocked to receive a threaded end 23 of a pin 24.

The pin 24 is housed in a pass-through hole 21' aligned with the holing 21 of the shoulder 11 of the body 16 of the unit 14, 15. The pin 24 provides, in its protruding part, a housing 25 for the tip of a blocking grub screw 26 screwed into a threaded hole or pass-through seat 27 with a flared outer end, formed in a direction perpendicular to the pass-through hole 21' intersecting with the same.

Said pin 24 defines a connection group GC to be firmly blocked for stably interconnecting the shoulder 11 and the base 12 by the actuation of blocking means. As already mentioned, the blocking means in this example consist of a grub screw 26, as can be seen in FIG. 4, which acts on the pin 24. Further examples described hereunder show how there can be different types of blocking means between the shoulder 11 and the base 12.

It can also be seen how the body 16 also provides, in the centre, a seat S2 for a leveling group GL having a substantially elongated configuration, in the form of a vertical blind holing 28 which intersects with a first and a second horizontal pass-through holing (or seat) 29 and 30, spaced from each other, superimposed and which intersect with the holing 28. The seat S2 extends inwardly an upwardly from a lower edge B2 of the body 16.

A pair of half-shells 31, 32 are housed in the vertical holing 28, which form a cylindrical casing inside part of which a lower rest part 33 of the foot is caused to slide by means of a regulation mechanism in height.

This movement is driven by means of a pinion-toothed crown bevel. A pinion 34 is in fact rotatingly positioned inside a hole formed in one of the two half-shells 31, which is aligned with the second horizontal holing 30 in the front-foot unit 14 shown in FIGS. 2 and 3.

The pinion 34 engages with a toothed crown 35, formed as head of a threaded screw 36. The toothed crown 35 can rotate in a seat formed in the two coupled half-shells 31 and 32. The threaded screw 36 is in turn positioned in a threaded axial hole 37 and inside the foot 33.

A shaped tool 40, provided, for example, with a hexagonal head 41, is suitable for being inserted inside a complementary seat of the pinion 34 passing through the second holing 30 of the body 16 so as to be coupled with the same and cause its rotation.

The rotation of the pinion 34 in turn causes the rotation of the toothed crown 35 of the head of the threaded screw 36. The rotation of the threaded screw 36 forces the downward movement of the foot 33.

This arrangement has been described for the front-foot unit 14.

In the second rear-foot unit 15, the arrangement is quite similar and above all, a long-stemmed shaped tool 40' must be provided, also having a hexagonal head 41, suitable for being inserted inside a complementary seat of the pinion 34 passing through the first holing 29 of the body 16 so as to be coupled with the same and cause its rotation.

In this case, it should be noted how, according to the invention, pass-through holes 29 ad 30 are formed in the body 16 of the foot units 14 and 15, which allow, for example, the long-stemmed shaped tool 40' to pass inside the body 16 of the front-foot unit 14 and reach the rear-foot unit 15, subsequently acting as described above.

The same provision must also be made for the pass-through threaded hole 27 with a flared outer end which, in the first front-foot unit 14, receives the grub screw 26. Adjacent to the same, according to a horizontal direction, a second threaded pass-through hole or seat 27' is provided in the body 16, which allows the passage of a long-stemmed shaped tool 40', also provided with a hexagonal head 41, which is inserted in a grub screw 26 of the second rear-foot unit 15 causing the blockage of the blocking group GB.

It should be noted that in order to enable the arrangement of adjacent holes 27 and 27', the pins 24 of the front-foot unit 14 and rear-foot unit 15 have a different length so as to receive the grub screws 26 of the two front-foot 14 and rear-foot 15 units. The flaring produced in all the pass-through holes 27, 27' e 29 and 30, moreover, allow an easy insertion of the tool 40, 40' without any difficulty for the operator entrusted with the assembly and adjustment.

The functioning of the compact joining and leveling system for parts of furniture and furnishing items described above is simple and can be easily understood from what is indicated above and shown in the enclosed drawings.

This type of compact joining and leveling system for parts of furniture and furnishing items according to the invention allows there to be no visible holes, once it has been correctly assembled for connecting and leveling the furniture It is fixed to the bottom of the furniture and allows its front actuation with respect to the furniture through the space between the bottom or base and floor even when the space between the base and floor is extremely limited.

It should also be noted that this type of system according to the invention contains both the connection or joining group with its relative blockage and also the leveling group beneath the thickness of the base or shelf or front bottom of the furniture.

Any actuation problem is eliminated, as it is possible to operate in both connection and, above all, in leveling from the front part of the furniture without any visible hole of the furniture itself.

With respect to FIGS. 6 to 11, it can be seen how these show a second example of a joining and leveling system for parts of furniture and furnishing items produced according to the present invention designed for joining a shoulder and a base of a piece of furniture.

In particular, the same reference numbers are used for the same elements, even if not specifically indicated and described.

In particular, FIG. 6 shows how a joining and leveling system for parts of furniture and furnishing items comprising at least a front-foot unit 14 and a rear-foot unit 15, is fixed to the bottom 12.

Both of the units 14 and 15 incorporate leveling devices for parts of furniture and furnishing items and partly joining devices.

In FIGS. 6 to 11, it can be seen how a generic foot unit 14, 15 of the joining and leveling system for parts of furniture and furnishing items according to the invention also comprises, in this case, a body 16, in a non-limiting example, shaped with an arched foot, that can be associated by means of at least one interlocking pin 17 and at least one snap pin 18, with a hole 19 of a shoulder 11 and a hole 20 of a base 12, respectively.

In the example of these figures, it can be seen how the shoulder 11 also provides a seat S1 in the form of a horizontal blind holing 21 in which an internally threaded sleeve 22 is positioned and blocked to receive a threaded end 23 of a pin 24.

In this case, the pin 24 is housed in a pass-through hole 21" of the base 12 aligned with the holing of the shoulder 11.

The pin 24 provides, in its protruding part, a housing 25 for the tip of a blocking grub screw 26 shown in FIGS. 8 and 9.

In this case, the grub screw 26 is moved with an arrangement similar to that shown for the movement of the previous leveling foot.

Part of a connection group GC is in fact positioned in a seat S3. The seat S3 has a substantially elongated configuration, in the form of a vertical blind holing which intersects with a first and a second horizontal pass-through holing (or seat) 46 and 47, spaced from each other and superimposed.

A pair of half-shells 48, 49 are housed in this vertical blind holing 45, which form a cylindrical casing inside part of which a threaded drive screw 50 of the grub screw 26 is caused to rotate. In reality, the two half-shells 48 and 49 extend upwardly and are inserted in a blind hole 54 in the base 12. This hole 54 in the base 12 intersects the hole 21", also in the base 12 and positioned at 90° with respect to the same, in which the pin 24 is inserted with the relative housing 25 in which the grub screw 26 is positioned.

The rotation of the threaded screw 50 is driven by means of a pinion-toothed crown bevel. A pinion 51 is in fact rotatingly positioned inside a hole formed in one of the two half-shells 48, which is aligned with the first horizontal holing 46 in the front-foot unit 14 shown in FIG. 7.

The pinion 51 engages with a toothed crown 52, formed as head of the above-mentioned threaded screw 50. The toothed crown 52 can rotate in a seat formed in the two coupled half-shells 48 and 49. The threaded screw 50 is in turn positioned in a threaded axial hole 53 and inside the grub screw 26.

A shaped tool 40, provided, for example, with a hexagonal head 41, is suitable for being inserted inside a complementary seat of the pinion 51 passing through the holing 46 of the body 16 so as to be coupled with the same and cause its rotation.

The rotation of the pinion 51 in turn causes the rotation of the toothed crown 52 of the head of the threaded screw 50. The rotation of the threaded screw 50 forces the upward movement of the grub screw 26.

This arrangement has been described for the front-foot unit 14, but is similarly provided in the rear-foot unit 15 with actuation by means of the long-stemmed tool 40' which passes into a pass-through hole 47 formed in the body 16 of the front-foot unit 14. The pinion 51 is therefore positioned in correspondence with the hole 47 and the threaded screw 50 is longer, as it is actuated from the lower hole 47 in the body 16.

It can naturally also be seen how the body 16 provides a seat S2 for a leveling group GL having a substantially elongated configuration, in the form of a vertical blind holing 28 which intersects with a first and a second horizontal pass-through holing 29 and 30, spaced from each other, superimposed and which intersect with the holing 28. The seat S2 extends inwardly an upwardly from a lower edge B2 of the body 16.

A pair of half-shells 31, 32 are housed in the vertical holing 28, which form a cylindrical casing inside part of which a lower rest part 33 of the foot is caused to slide.

This movement is driven by means of a pinion-toothed crown bevel. A pinion 34 is in fact rotatingly positioned inside a hole formed in one of the two half-shells 31, which is aligned with the second horizontal holing 30 in the front-foot unit 14 shown in FIGS. 2 and 3.

The pinion 34 engages with a toothed crown 35, formed as head of a threaded screw 36. The toothed crown 35 can rotate in a seat formed in the two coupled half-shells 31 and 32. The threaded screw 36 is in turn positioned in a threaded axial hole 37 and inside the foot 33.

A shaped tool 40, provided, for example, with a hexagonal head 41, is suitable for being inserted inside a complementary seat of the pinion 34 passing through the second holing 30 of the body 16 so as to be coupled with the same and cause its rotation.

The rotation of the pinion 34 in turn causes the rotation of the toothed crown 35 of the head of the threaded screw 36. The rotation of the threaded screw 36 forces the downward movement of the foot 33.

This arrangement has been described for the front-foot unit 14.

In the second rear-foot unit 15, the arrangements are quite similar and above all, a long-stemmed shaped tool 40' must be provided, also having a hexagonal head 41, suitable for being inserted inside a complementary seat of the pinion 34 passing through the first holing 29 of the body 16 so as to be coupled with the same and cause its rotation.

In this case, it should be noted how, according to the invention, pass-through holes 29 ad 30 are formed in the body 16 of the foot units 14 and 15, which allow, for example, the long-stemmed shaped tool 40' to pass inside the body 16 of the front-foot unit 14 and reach the rear-foot unit 15, subsequently acting as described above.

Figure 11:
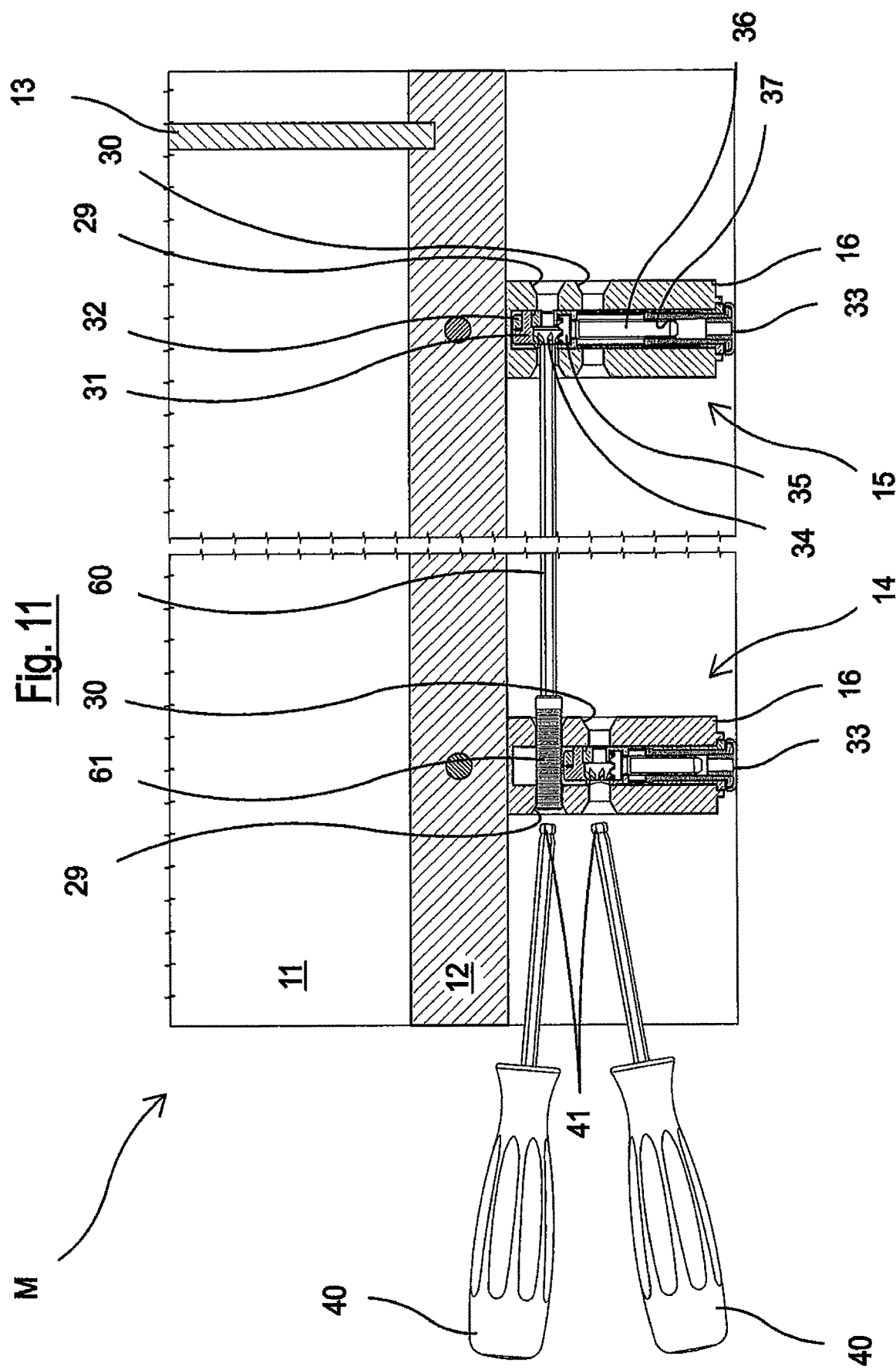
FIG. 11 is an enlarged longitudinal sectional view of a system according to the present invention provided with a transmission rod for the leveling of the rear foot.
Figure 12:
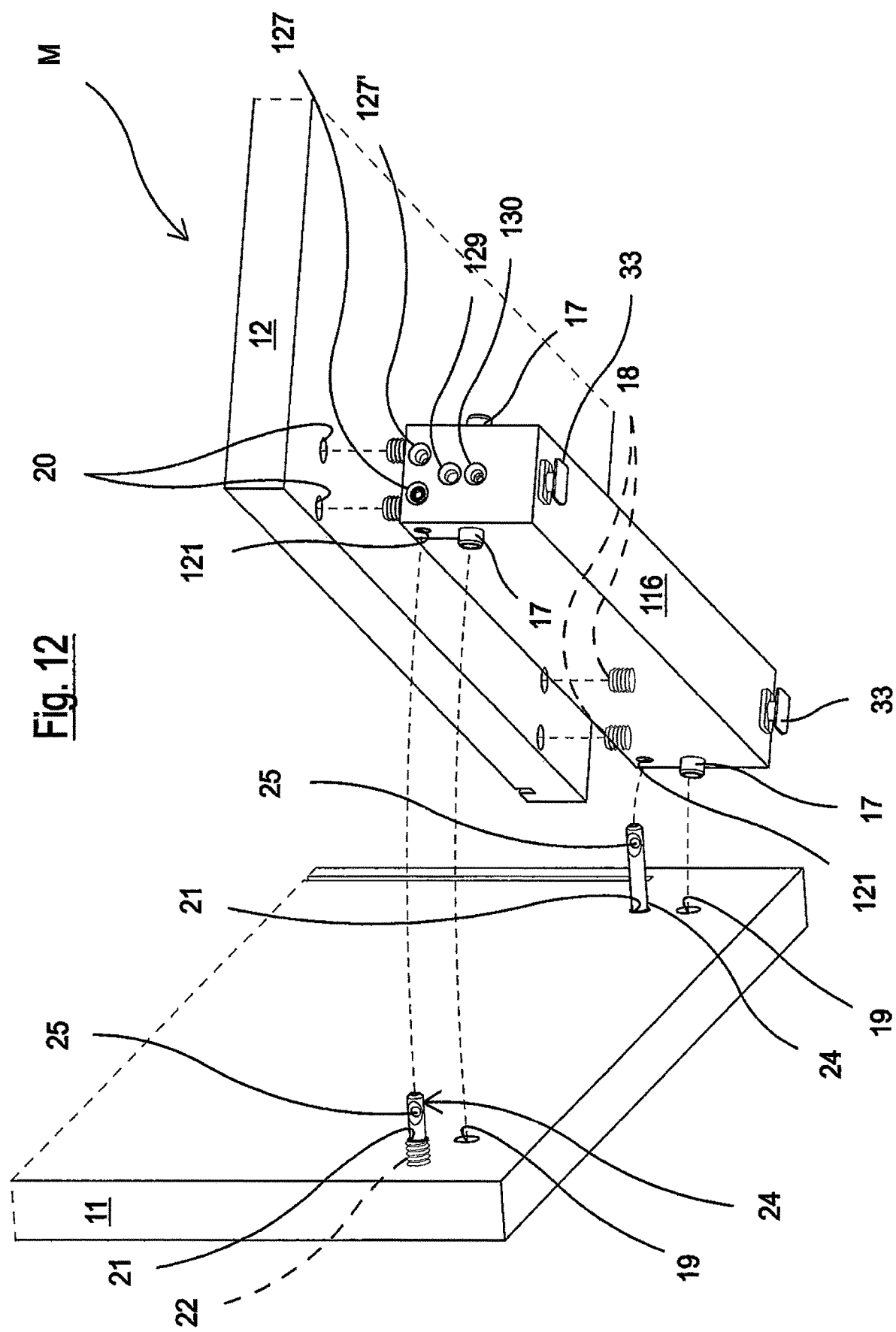
FIG. 12 is a perspective view with exploded parts that illustrate a third example of a joining and leveling system for parts of furniture and furnishing items produced according to the present invention designed for joining a shoulder and a base or bottom of a piece of furniture.
Figure 17:
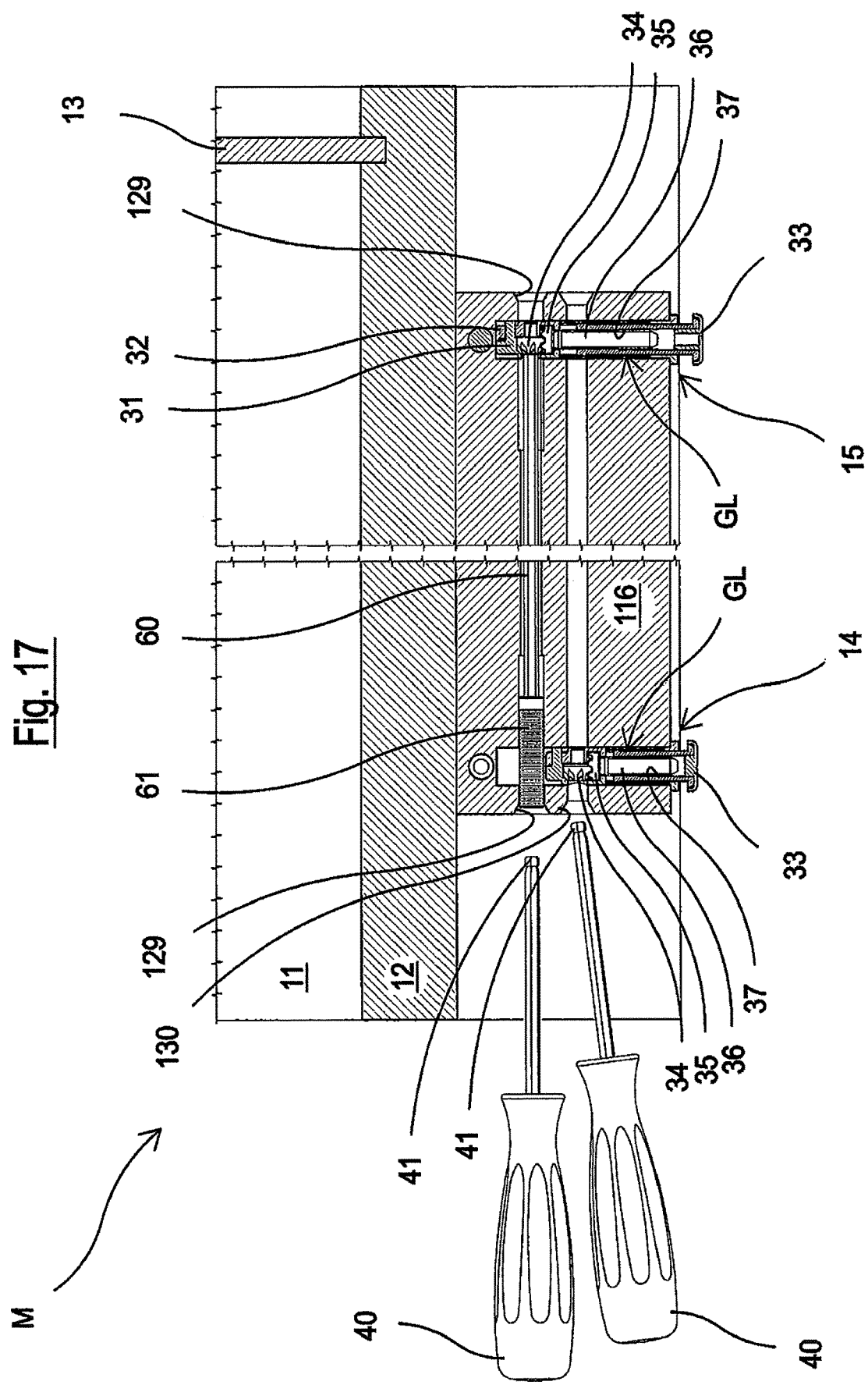
FIG. 17 is an enlarged longitudinal sectional view of a system according to the present invention provided with a transmission rod for the leveling of the rear foot.

FIG. 11 is an enlarged longitudinal sectional view of a system according to the present invention provided with a transmission rod 60 for the leveling of the rear-foot unit 15. A maneuvering seat 61 of the transmission rod 60 is positioned in the pass-through hole 29 of the body 16 of the first front-foot unit 14. The pinion 34 previously described, is actuated by means of the transmission rod 60, with actuation of the lower part 33 of the leveling foot.

FIGS. 1 to 11 all illustrate a body 16 which contains both the leveling or leveler group and the connection or joining group. In a further variant, moreover, two half-shells, having exactly the same form as that of the body 16, can be provided, which directly contain, for example, the mechanics and elements of the leveling group and the mechanics and elements of the connection or joining group.

FIGS. 12 to 17 show a further embodiment or a further example of the system according to the present invention.

This example, in which the same elements have the same reference numbers previously indicated, provides that the front- and rear-foot units are joined in a single body 116. Pass-through holes 121 in the body 116 receive the pins 24 to be blocked by the grub screws 26. Furthermore, pass-through and threaded holes (or seats) 127, 127' allow the grub screws 26 to be inserted and also the tools 40, 40' for blocking them.

Pass-through holes or seats 129 and 130 are provided in the body 116 for the actuation of the front and rear leveling devices, which actuate leveling groups identical to those previously described, for example in relation to the first embodiment shown in FIG. 5, to which reference is made.

Figure 18:
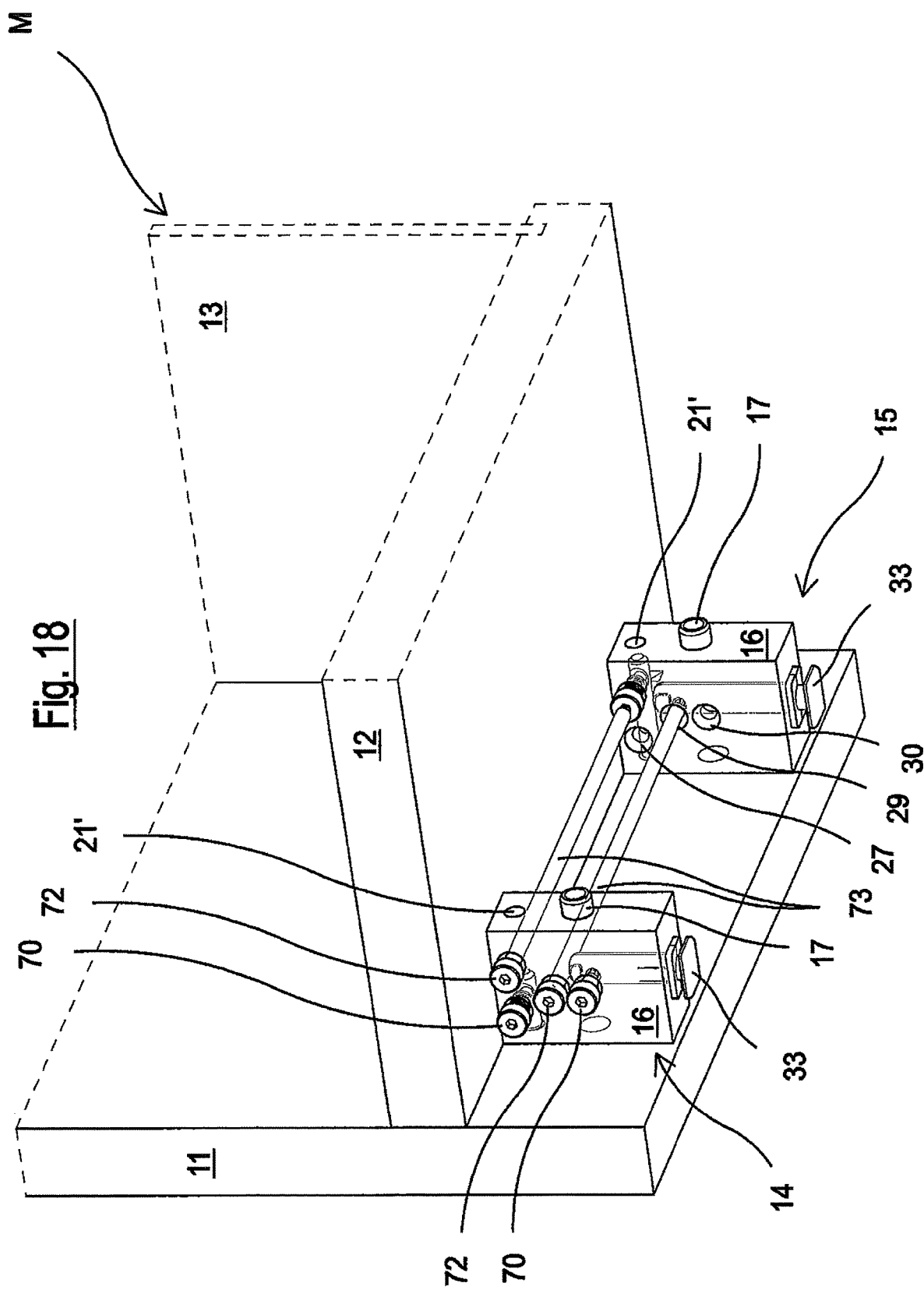
FIG. 18 is a perspective view illustrating a further example of a joining and leveling system for parts of furniture and furnishing items produced according to the present invention designed for joining a shoulder and a base or bottom of a piece of furniture.

FIG. 18 is a perspective view which illustrates a further example of a joining and leveling system for parts of furniture and furnishing items produced according to the present invention designed for joining a shoulder and a base or bottom of a piece of furniture.

In this figure, analogously to what is shown in FIG. 1, it can be seen that four heads with a hexagonal imprint 70, 72 are positioned on the body 16 of the front-foot unit 14, for actuating the joining and leveling. The heads 70 directly control both the joining and the leveling elements of the front-foot unit 14. The further two heads 72 control, by means of transmission rods 73, both the joining and the leveling elements of the rear-foot unit 15.

Furthermore, in the following figures, in which the same reference numbers can be used as those previously adopted for the same elements, other examples are illustrated of blocking means between a generic shoulder or side wall 11 and a base or shelf 12 forming the connection group GC and which are such as to interconnect and firmly block the parts.

FIGS. 19 to 21 re-propose, in a sectional detail parallel to the floor P in an exploded position, in a close-range position and blocked position, respectively, what is described in the previous examples described, i.e. that the blocking means consist of a blocking grub screw 26 acting on a pin 24 screwed in a threaded hole or seat 27 of the connection group GC.

Figure 22:
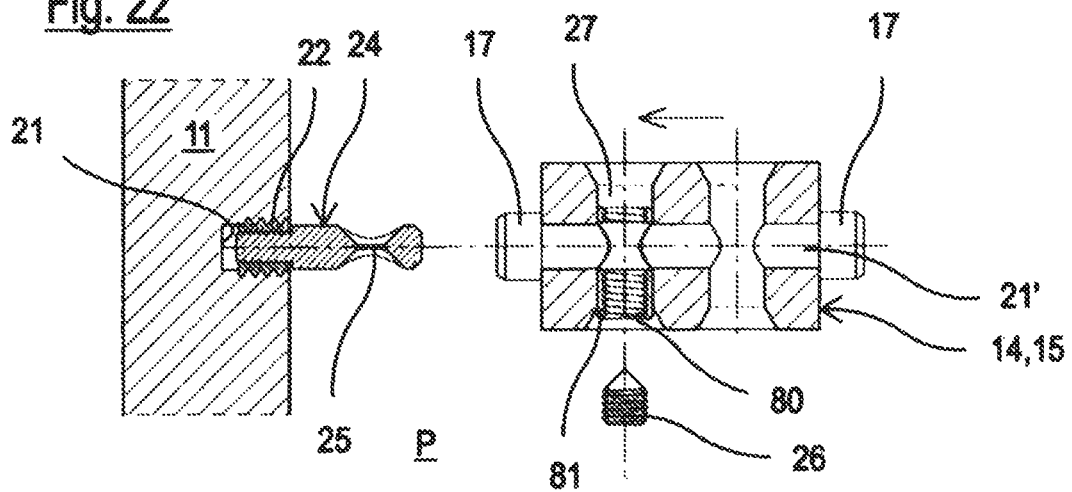
FIGS. 22 to 24 show, in a sectional detail parallel to the floor P, an exploded view in position, a close-range view and a view in a blocked position respectively of a second example of blocking means forming part of a connection group.
Figure 23:
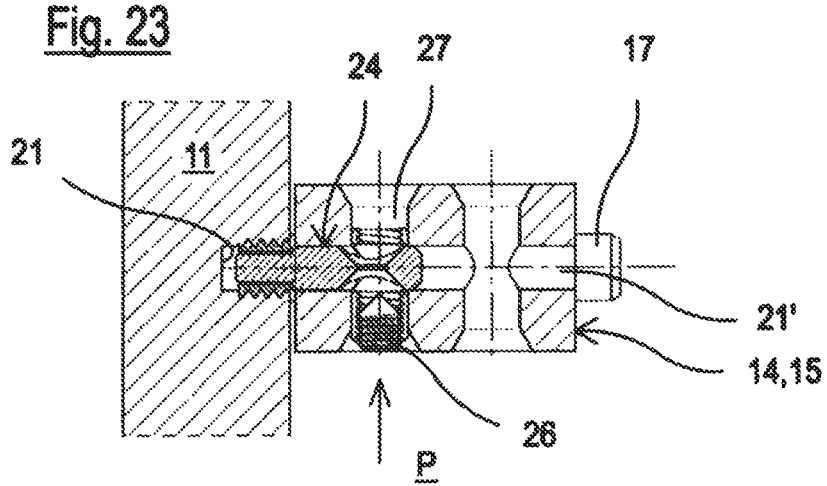
Figure 24:
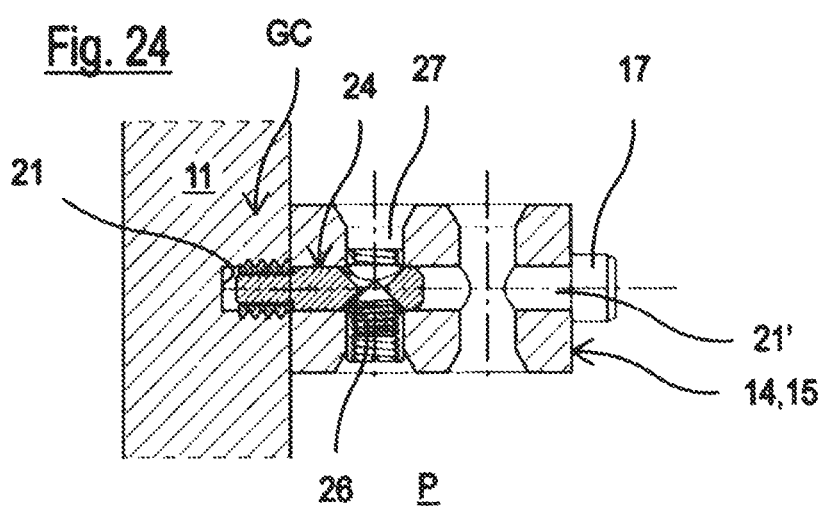
Figure 25:
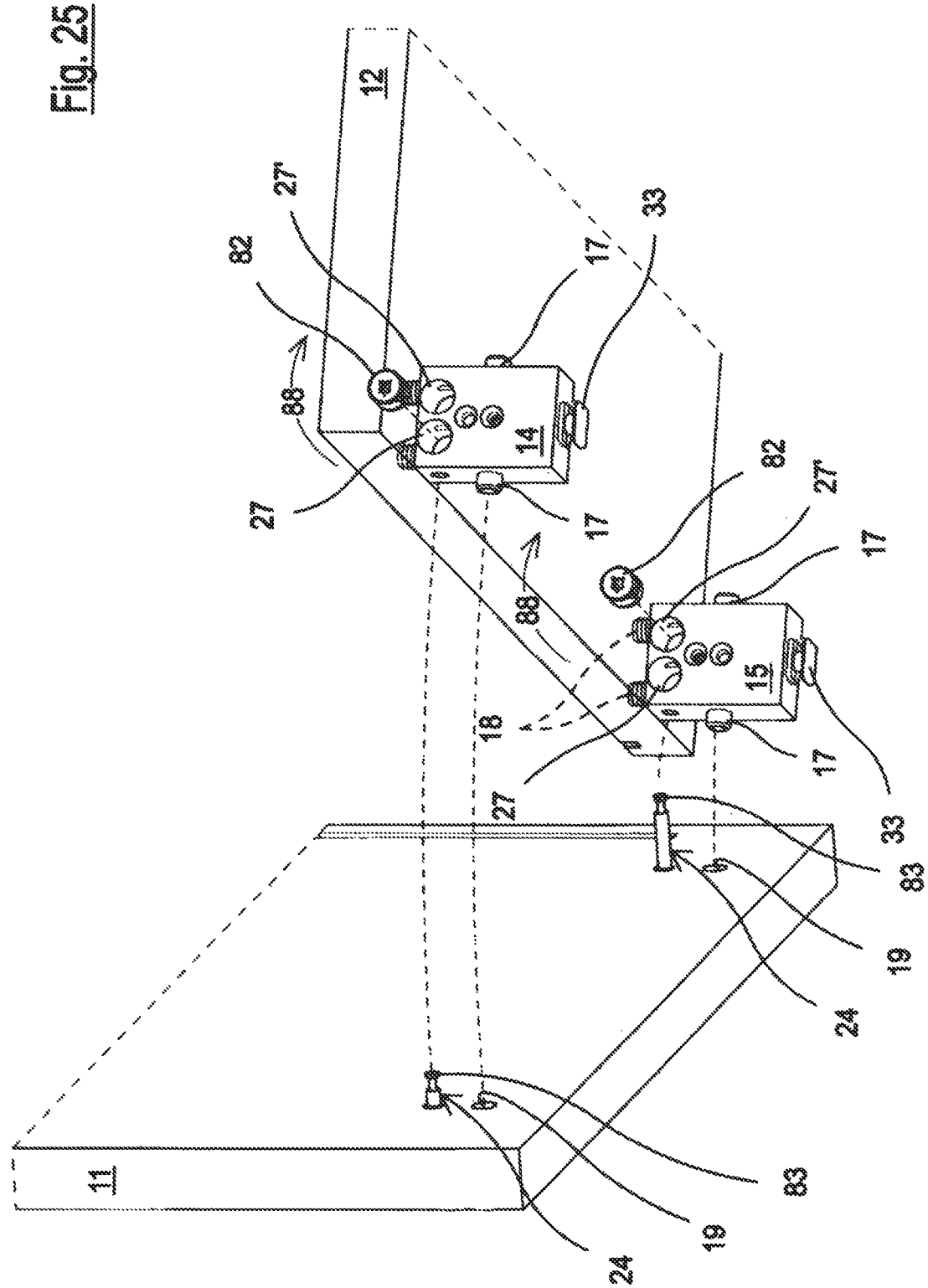
FIG. 25 shows, in an exploded perspective view, a third example of blocking means forming part of a connection group.
Figure 26:
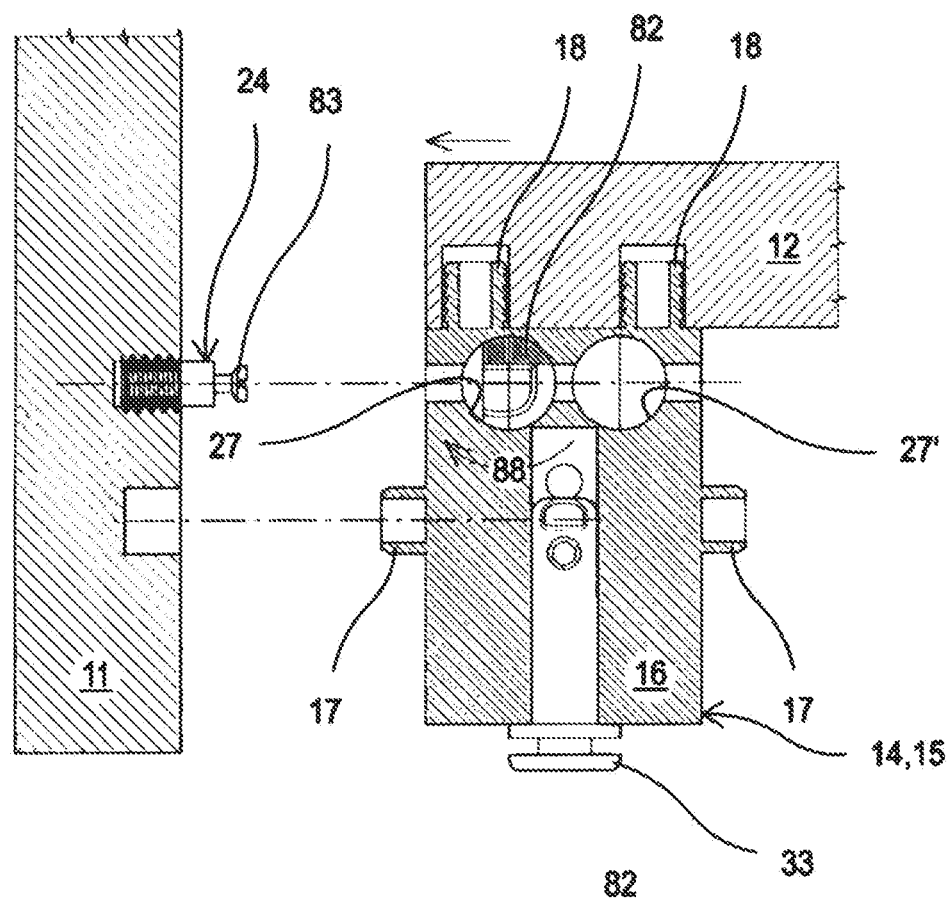
FIGS. 26 and 27 show, in an exploded raised side sectional detail and in an exploded section parallel to the floor P, the third example of blocking means forming part of a connection group shown in FIG. 25.
Figure 27:
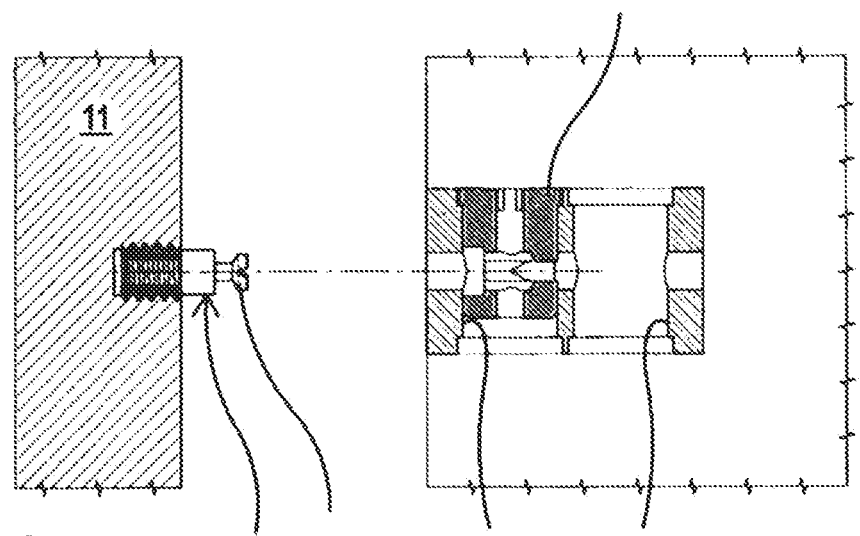

FIGS. 22 to 24 show, in a sectional detail parallel to the floor P in an exploded position, in a close-range position and blocked position, respectively, a further example of blocking means.

In this example, a grub screw 26 is screwed into an internal threaded hole 80 of a barrel 81. The barrel 81 is positioned in a hole 27 of the front-foot unit 14 and/or rear-foot unit 15. The hole 27 is perpendicular and intersects with the pass-through hole 21' aligned with the holing 21 of the shoulder 11. The barrel 81 with grub screw 26 defines alternative blocking means.

FIGS. 25 to 29 show a further embodiment of the above-mentioned blocking means.

In this example, the blocking means comprise for each front-foot unit 14 and/or rear-foot unit 15 in a pass-through hole 27, a cam hooking element that can be rotated with a tool according to the arrow 88.

Figure 28:
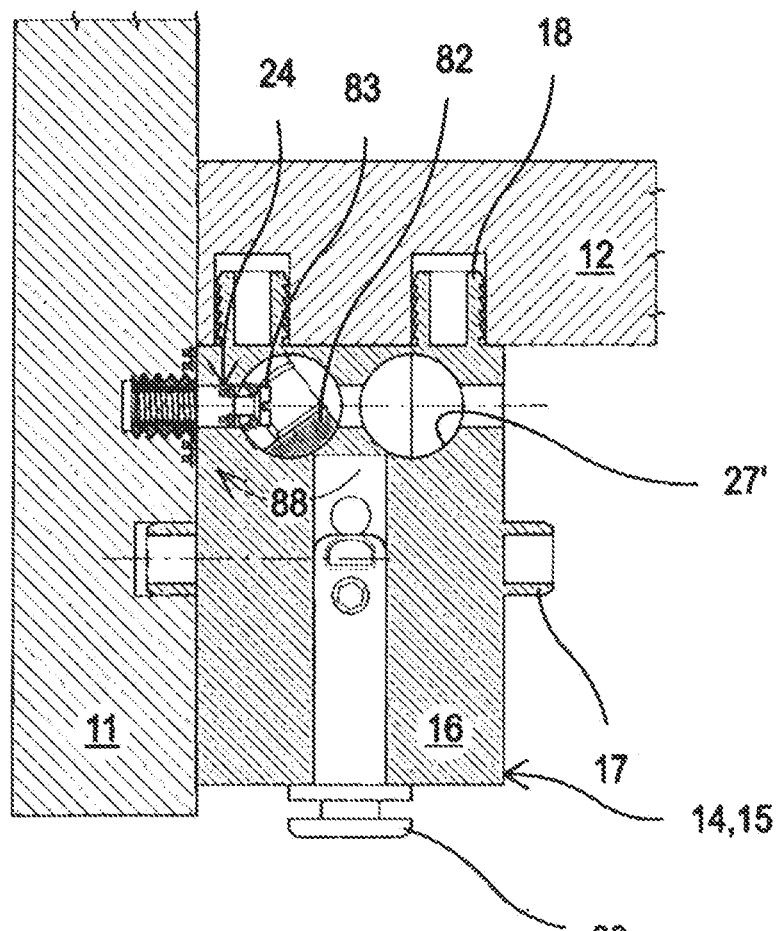
FIGS. 28 and 29 show views completely analogous to those of FIGS. 26 and 27, but in position with parts blocked between each other of the connection group shown in FIG. 25.
Figure 29:
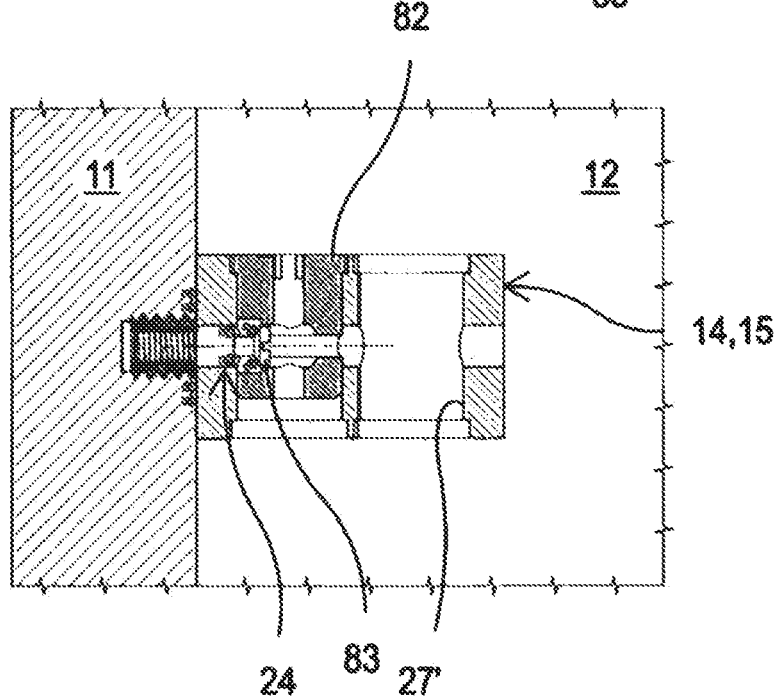

Upon rotation, the cam hooking element 82 is engaged with an enlarged head 83 of the pin 24 positioned integral with the shoulder 11, blocking the parts between them as shown in FIGS. 28 and 29.

FIGS. 30 to 32 show a further embodiment of blocking means.

In this case, a pair of half-shells 148, 149 are housed in the body 16 of each front-foot unit 14 and/or rear-foot unit 15 in the pass-through hole 21' facing the hole 21 of the shoulder, forming a cylindrical casing. A threaded screw 150 suitable for being engaged in an internally threaded sleeve 122 positioned in the blind hole 21, is caused to rotate in a part of said casing.

The rotation of the threaded screw 150 is driven by means of a pinion-toothed crown bevel. A pinion 151 is in fact rotatingly positioned inside a hole formed in one of the two half-shells, which is aligned with the hole 27 of the front-foot unit 14 or 15 shown in FIGS. 30 to 32.

The pinion 151 engages with a toothed crown 152, formed as head of the above-mentioned threaded screw 150. The toothed crown 152 can rotate in the casing.

The threaded screw 150 protrudes laterally from the body 16 of the front-foot unit 14 or 15.

This end of the threaded screw 150, when the shoulder 11 is moved towards the base 12 i.e. towards the front-foot unit 14 or 15, it is suitable for being screwed into the internally threaded sleeve 122, positioned in the shoulder 11.

In this way, by acting from the front to rotate the pinion 151-toothed crown 152 bevel with a tool, a stable positioning and blocking of the shoulder with respect to the base, are obtained.

FIGS. 33 to 36 show yet another embodiment of blocking means.

In this further example, blocking and joining means in a single element 160 are provided, such as those described in EP 930 436 A1.

In this way, all the mechanisms of these means are contained in this single element 160. The single element 160 comprises, in a casing 163, a pinion-toothed crown bevel for actuating expandable gripping means 161 which are positioned in the hole 21 of the shoulder 11 for being anchored in the same.

In this example, the joint in a single element 160 is positioned in a hole 21' of the body 16 of each front-foot unit 14 and/or rear-foot unit 15.

It is therefore sufficient to act with a tool from the front in the space between the bottom and floor P to cause the rotation of a pinion 162 rotatingly positioned in a casing 163 in two parts of the single element 160. The pinion 162 engages with a toothed crown 164, formed as head of a threaded screw 165. The toothed crown 164 is rotatable in the casing and the threaded screw 165 engages in a conical sleeve 166, internally threaded, which protrudes laterally in one of its ends, from the body 16 of the front-foot unit 14 or 15.

This end of the sleeve 166 externally carries the above-mentioned expandable gripping means 161 in the form of hooks suitable for being engaged in the hole 21.

When at rest, the free end of the single element 160 is inserted in the hole 21 of the shoulder and the threaded screw 165 is then rotated, causing the conical sleeve 166 to cause the expansion of the hooks of the expandable means 161 which are engaged in the walls of the hole 21.

The stable and final blocking between the shoulder 11 and bottom 12 of the furniture is thus obtained.

In view of the various embodiments illustrated and described above, the features of the system of the present invention are repeated hereunder.

This type of compact joining and leveling system for parts of furniture and furnishing items enables there to be no visible hole, once it has been correctly assembled for connecting and leveling the piece of furniture, thus conferring a high aesthetic and functional feature to the piece of furniture.

As can be seen, this system is fixed to the bottom of the furniture and allows its front actuation with respect to the furniture through the space between the bottom or base and the floor even when the space between the base and floor is extremely limited and restricted for an operator.

With the system of the present invention, both the connection or joining group with relative blocking, and the leveling group under the thickness of the base or shelf or front bottom of the furniture are advantageously particularly compact and easy to actuate on the part of any operator.

Any actuation problem is eliminated, as it is possible to operate in both connection and, above all, in leveling from the front part of the furniture without any visible hole of the furniture itself.

This provision also allows the elimination of any additional element for ensuring the correct direction or orientation of the screwdriver that must be present in additional known systems in the form of a guide or the like, fixed to the bottom of the furniture.

The objectives mentioned in the preamble of the description have therefore been achieved.

The protection scope of the present invention is defined by the enclosed claims.

The invention claimed is:

1. A compact joining and leveling system for parts of furniture and furnishing items (M) with a bottom (12) and a shoulder (11) comprising:
   at least one front-foot unit (14); and
   at least one rear-foot unit (15), each front foot unit (14) and rear-foot unit (15) having a body,
   wherein each front- and rear-foot unit (14, 15) comprises a leveling group (GL) with a regulation mechanism in height that is maneuverable with tools (40, 40'),
   wherein said leveling group (GL) of said front- and rear-foot units (14, 15) are configured to be actuated from a front position with respect to the furniture through a space between a base and a floor; and
   a connection group (GC) that stably interconnects said bottom (12) and said shoulder (11) through a blocking element (26; 82; 150-152; 160),
   wherein said connection group (GC) is configured to be actuated from the front position with respect to a piece of furniture through a space between the bottom and the floor.

2. The system according to claim 1, wherein said front-foot unit (14) and said rear-foot unit (15) are positioned beneath said bottom (12) between said shoulder (11) and said bottom (12), said front- and rear-foot units (14, 15) providing a plurality of holes or pass-through seats (27, 27'; 29, 30; 46, 47; 129, 130; 127, 127') for said tools (40, 40') of the connection group (GC) and leveling group (GL).

3. The system according to claim 1, wherein said front-foot unit (14) and said rear-foot unit (15) provide single bodies (16) which house said connection group (GC) and leveling group (GL).

4. The system according to claim 1, wherein the bodies of said front-foot unit (14) and said rear-foot unit (15) are formed as a single body (116) which houses said connection group (GC) and leveling group (GL) of both said front-foot unit (14) and said rear-foot unit (15).

5. The system according to claim 1, further comprising one or more pins protruding from said shoulder (11) and inserted in holes (21', 121) formed in said body for receiving said blocking element of said connection groups (GC) that consist of one or more grub screws (26) positioned inside one or more threaded pass-through holes (27, 27'; 127, 127') of said body.

6. The system according to claim 5, wherein said one or more threaded pass-through holes (27, 27'; 127, 127') of said body (16, 116) are positioned alongside according to a horizontal direction in said body (16, 116).

7. The system according to claim 1, wherein each front-foot unit (14) and rear-foot unit (15) provides said connection group (GC) comprising a pin (24), positioned integrally in a shoulder (11), and said blocking element consists of a grub screw (26) positioned inside a threaded hole (27, 27'; 127, 127'; 45) of said body (16, 116) and movable in engagement with said pin (24), and said leveling group (GL) provided with a vertical regulation mechanism in height of a lower supporting part of the foot (33).

8. The system according to claim 7, wherein said grub screw (26) is caused to move inside a vertical hole (45) of said body (16) by a regulation mechanism positioned in said body according to a vertical direction and protruding to be housed in a hole (54) formed in said bottom (12) intersecting a hole (21") in which said pin (24) integral with said shoulder (11), is inserted.

9. The system according to claim 1, wherein said body (16, 116) provides at least one interlocking pin (17) and at least one snap pin (18) respectively positioned in a hole (19) of said shoulder (11) and at least one hole (20) of said bottom (12).

10. The system according to claim 1, wherein said regulation mechanism in height of said leveling group (GL) provides a pinion-toothed crown bevel comprising a pinion (34) rotatingly positioned inside a hole formed in a casing (31, 32), which engages with a toothed crown (35), produced as a head of a threaded screw (36) in turn positioned in an axial threaded hole (37), internal and connected to a lower foot portion (33).

11. The system according to claim 1, wherein said connection group (GC) comprises said blocking element consisting of a blocking grub screw (26) screwed into a threaded pass-through hole (27) of a body (16, 116), said hole (27) having a flared outer end and being formed in a direction perpendicular to a pass-through hole (21') which receives a pin (24) that extends from a shoulder (11) intersecting said pin.

12. The system according to claim 1, wherein said connection group (GC) is positioned in a body (16) that provides a seat (S3) shaped as a vertical blind hole (45), which intersects with a first and a second horizontal pass-through hole (46, 47), spaced from each other and superimposed, wherein said vertical blind hole (45) houses a cylindrical casing (48, 49), in which a threaded actuation screw (50) of a grub screw (26) is caused to rotate, and wherein said casing (48, 49) extends upwards and is inserted in a blind hole (54) of said bottom (12), which intersects a hole (21"), also in the bottom (12) and positioned at 90° with respect to the bottom, in which a pin (24), which extends from said shoulder (11) and houses the grub screw (26), is inserted.

13. The system according to claim 12, wherein a rotation of the threaded actuation screw (50) is driven by a pinion-toothed crown bevel, wherein a pinion (51) is rotatingly positioned inside a hole formed in a casing (48, 49), said hole being aligned with the first horizontal pass-through hole (46) in the front-foot unit (14), and wherein the pinion (51) engages a toothed crown (52), produced as a head of the threaded actuation screw (50), the toothed crown (52) being rotatable in a seat formed in said casing (48, 49), said threaded actuation screw (50) being positioned in a threaded axial hole (53) inside the grub screw (26).

14. The system according to claim 1, wherein said front-foot unit (14) and said rear-foot unit (15) are positioned beneath said bottom (12) between said shoulder (11) and said bottom (12), said front-foot and rear-foot units (14, 15) providing a plurality of maneuvering points for actuating the connection group (GC) and the leveling group (GL).

15. The system according to claim 1, wherein said front-foot unit (14) and said rear-foot unit (15) each comprise two half-shells directly containing mechanics and elements of the leveling group (GL) and mechanics and elements of the connection group (GC).

16. The system according to claim 1, wherein said blocking element of said connection group (GC) consist of a barrel (81) with a grub screw (26) inserted in a hole (27, 27') of said front-foot and rear-foot units (14, 15).

17. The system according to claim 1, wherein said blocking element of said connection group (GC) consist of a cam hooking element (82) rotatable by a tool inserted in a hole (27, 27') of said front-foot and rear-foot units (14, 15), which, upon rotation, becomes engaged with an enlarged head (83) of a pin (24) positioned integrally in said shoulder (11).

18. The system according to claim 1, wherein said blocking element of said connection group (GC) consist of a cylindrical casing (148, 149) inserted in a pass-through hole (21') of said front-foot and rear-foot units (14, 15), which is facing a blind hole (21) in said shoulder (11), wherein a threaded screw (150) adapted to be engaged in an internally threaded sleeve (122) positioned in the blind hole (21), is caused to rotate in a part of said casing, and wherein a rotation of the threaded screw (150) is driven by a pinion-toothed crown bevel (151, 152).

19. The system according to claim 1, wherein said blocking element of said connection group (GC) consist of a single element (160) which comprises, in a casing (163), a pinion-toothed crown bevel (162, 164) for actuating an expandable gripping element (161) which is positioned inside a blind hole (20) of the shoulder (11) for being anchored in the shoulder, and wherein said single element (160) is positioned in a hole (21') of said front-foot and rear-foot units (14, 15).

* * * * *